United States Patent
Wu et al.

(10) Patent No.: US 11,909,470 B2
(45) Date of Patent: Feb. 20, 2024

(54) JOINT BROADCAST AND UNICAST DESIGN FOR MULTIPLE-INPUT MULTIPLE-OUTPUT SYSTEMS

(71) Applicant: QUALCOMM INCORPORATED, San Diego, CA (US)

(72) Inventors: Liangming Wu, Beijing (CN); Kangqi Liu, Beijing (CN); Changlong Xu, Beijing (CN); Jian Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/797,382

(22) PCT Filed: Mar. 27, 2020

(86) PCT No.: PCT/CN2020/081703
§ 371 (c)(1),
(2) Date: Aug. 3, 2022

(87) PCT Pub. No.: WO2021/189426
PCT Pub. Date: Sep. 30, 2021

(65) Prior Publication Data
US 2023/0055302 A1 Feb. 23, 2023

(51) Int. Cl.
*H04L 1/02* (2006.01)
*H04B 7/0452* (2017.01)
*H04L 1/16* (2023.01)

(52) U.S. Cl.
CPC ............ *H04B 7/0452* (2013.01); *H04L 1/16* (2013.01)

(58) Field of Classification Search
CPC ... H04L 1/0026; H04L 1/1887; H04L 1/0076; H04L 1/0618; H04L 1/06; H04W 72/30;
(Continued)

(56) References Cited

U.S. PATENT DOCUMENTS

| 9,276,684 B2 | 3/2016 | Edge |
| 2019/0166575 A1* | 5/2019 | Van Phan ................. G01S 1/00 |
| 2019/0200296 A1 | 6/2019 | Liu et al. |
| 2019/0349947 A1 | 11/2019 | Bai et al. |

(Continued)

FOREIGN PATENT DOCUMENTS

| CN | 104937989 A | 9/2015 |
| CN | 110574466 A | 12/2019 |

(Continued)

OTHER PUBLICATIONS

International Search Report and Written Opinion—PCT/CN2020/081703—ISA/EPO—dated Dec. 31, 2020.
(Continued)

*Primary Examiner* — Khai Tran
(74) *Attorney, Agent, or Firm* — Holland & Hart LLP

(57) ABSTRACT

Methods, systems, and devices for wireless communications are described. A base station may transmit an encoded transmission via a broadcast to multiple user equipment (UE). Subsequently, the multiple UEs may transmit assistance information to the base station based on attempting to decode the broadcasted encoded transmission. If the decoding is unsuccessful for at least one UE, the base station may then transmit an additional encoded transmission via a unicast or multicast message to the UEs that were unsuccessful. Additionally, the base station may transmit configuration information for the multiple UEs to receive the encoded transmissions and to transmit the assistance information. For example, the configuration information may include portion information for how long the encoded transmission is transmitted via the broadcast, via the unicast, when to transmit the assistance information, etc. In some cases, the configuration information may be based on UE metrics of the multiple UEs.

30 Claims, 20 Drawing Sheets

(58) Field of Classification Search
CPC .... H04W 76/40; H04W 72/23; H04B 7/0413; H04B 7/0452
USPC ........................................ 375/267, 260, 262
See application file for complete search history.

(56) References Cited

U.S. PATENT DOCUMENTS

| | | | |
|---|---|---|---|
| 2020/0068528 | A1 | 2/2020 | Abraham et al. |
| 2020/0106674 | A1* | 4/2020 | Van Der Velde ............................ H04W 72/0453 |
| 2023/0014303 | A1* | 1/2023 | Di Girolamo ........ H04W 72/20 |
| 2023/0127560 | A1* | 4/2023 | Li ........................ H04W 76/23 370/329 |
| 2023/0262735 | A1 | 8/2023 | Wu et al. |

FOREIGN PATENT DOCUMENTS

| | | |
|---|---|---|
| CN | 110830952 A | 2/2020 |
| WO | WO-2014093393 A2 | 6/2014 |

OTHER PUBLICATIONS

Saily M., et al., "Broadcast and Multicast Communication Enablers for the Fifth-Generation of Wireless Systems Deliverable D3.4 RAT Protocols and Radio Resource Management in 5G-Xcast", Jul. 31, 2019, XP055685218, 109 Pages, chapters 3. 4. 6, Section 4.3.4, p. 36, Section 4.4.3, p. 41 -p. 42, figures Fig. 4.4-1.

Sun Y., et al., "Scheduling of Multicast and Unicast Services Under Limited Feedback by Using Rateless Codes", IEEE INFOCOM 2014—IEEE Conference on Computer Communications, IEEE, Apr. 27, 2014, XP032613495, pp. 1671-1679, Section I, p. 1671-p. 1672, figure 1, Section IV-C, p. 1673-p. 1674, Section VI, p. 1675-p. 1676.

Supplementary European Search Report—EP20926779—Search Authority—Munich—Nov. 28, 2023.

* cited by examiner

JOINT BROADCAST AND UNICAST DESIGN FOR MULTIPLE-INPUT MULTIPLE-OUTPUT SYSTEMS

CROSS REFERENCE

The present Application is a 371 national stage filing of International PCT Application No. PCT/CN2020/081703 by WU et al. entitled "JOINT BROADCAST AND UNICAST DESIGN FOR MULTIPLE-INPUT MULTIPLE-OUTPUT SYSTEMS," filed Mar. 27, 2020, which is assigned to the assignee hereof, and which is expressly incorporated by reference in its entirety herein.

FIELD OF TECHNOLOGY

The following relates generally to wireless communications and more specifically to joint broadcast and unicast design for multiple-input multiple-output (MIMO) systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, communications between a base station and a UE may be encoded to enable secure data transmissions. Efficient techniques are desired for supporting encoded communications between the base station and the UE.

SUMMARY

The described techniques relate to improved methods, systems, devices, and apparatuses that support joint broadcast and unicast design for multiple-input multiple-output (MIMO) systems. Generally, the described techniques provide for a base station to transmit configuration information to multiple user equipment (UE) for indicating portions of different durations (e.g., frames, subframes, slots) for communicating a set of data blocks between the base station and the multiple UEs. For example, the base station may attempt to transmit a data block to the multiple UEs according to the configuration information in a single duration of time, where the single duration of time is divided into multiple portions including at least a first portion, a second portion, and a third portion. In some cases, the base station may determine the different portions (e.g., lengths of time for the different portions) based on different UE metrics of the multiple UEs, such as a signal-to-noise ratio (SNR) reported by the multiple UEs, locations of the multiple UEs, channel state information (CSI) reported by the multiple UEs, or a combination thereof. Additionally or alternatively, the different portions may be preconfigured in the multiple UEs.

During the first portion of the single duration, the base station may transmit the data block in a first encoded transmission that is broadcast to the multiple UEs. Subsequently, in the second portion of the single duration, the multiple UEs may then report assistance information based on attempting to decode the first encoded transmission. For example, the assistance information may include an indication of whether a decoding process of the first encoded transmission is complete or incomplete, missing packet information, CSI, or a combination thereof. In some cases, if one or more of the multiple UEs transmit an indication that the first encoded transmission was unsuccessfully decoded, during the third portion of the single duration, the base station may then transmit an additional encoded transmission to the one or more UEs that were unsuccessful in decoding the first encoded transmission, where the additional encoded transmission is transmitted via unicast or multicast. The first encoded transmission and the additional encoded transmission may be encoded based on a rateless code, such as a fountain code, a Luby transform code, a Raptor code, or a combination thereof. Additionally, the additional encoded transmission may be a retransmission of portions of first encoded transmission (e.g., missing packets or packets stalling decoding) or may be one or more additional encoded packets based on the rateless code.

A method of wireless communications at a UE is described. The method may include receiving, from a base station, configuration information for communication of a set of data blocks in a set of respective durations, determining, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, receiving, from the base station via a broadcast message in the first portion of a first duration of the set of respective durations, the first encoded transmission for a respective data block of the set of data blocks, where the first encoded transmission is based on a rateless code, performing a decoding process on the first encoded transmission, and transmitting, to the base station, assistance information during the second portion of the first duration indicated in the configuration information for reporting assistance information for the first encoded transmission based on performing the decoding process.

An apparatus for wireless communications at a UE is described. The apparatus may include a processor, memory coupled with the processor, and instructions stored in the memory. The instructions may be executable by the processor to cause the apparatus to receive, from a base station, configuration information for communication of a set of data blocks in a set of respective durations, determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, receive, from the base station via a broadcast message in the first portion of a first duration of the set of respective durations, the first encoded transmission for a respective data block of the set of data blocks, where the first encoded transmission is based on a rateless code, perform a decoding process on the first encoded transmission, and transmit, to the base station, assistance information during the second portion of the first duration indicated in the configuration information for reporting assistance information for the first encoded transmission based on performing the decoding process.

Another apparatus for wireless communications at a UE is described. The apparatus may include means for receiving, from a base station, configuration information for communication of a set of data blocks in a set of respective durations, determining, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, receiving, from the base station via a broadcast message in the first portion of a first duration of the set of respective durations, the first encoded transmission for a respective data block of the set of data blocks, where the first encoded transmission is based on a rateless code, performing a decoding process on the first encoded transmission, and transmitting, to the base station, assistance information during the second portion of the first duration indicated in the configuration information for reporting assistance information for the first encoded transmission based on performing the decoding process.

A non-transitory computer-readable medium storing code for wireless communications at a UE is described. The code may include instructions executable by a processor to receive, from a base station, configuration information for communication of a set of data blocks in a set of respective durations, determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, receive, from the base station via a broadcast message in the first portion of a first duration of the set of respective durations, the first encoded transmission for a respective data block of the set of data blocks, where the first encoded transmission is based on a rateless code, perform a decoding process on the first encoded transmission, and transmit, to the base station, assistance information during the second portion of the first duration indicated in the configuration information for reporting assistance information for the first encoded transmission based on performing the decoding process.

Some examples of the method, apparatuses, and non-transitory computer-readable medium described herein may further include operations, features, means, or instructions for receiving, from the base station via a unicast message or a multicast message in the third portion of the first duration, the additional encoded transmission based on the assistance information including an indication that at least a portion of the first encoded transmission was not successfully decoded.

In some examples of the method, apparatuses, and non-transitory computer-readable medium described herein, the additional encoded transmission includes one of a set of multiple-user MIMO (MU-MIMO) transmissions transmitted by the base station in the third portion of the first duration to the UE and other UEs.

In some examples of the method, apparatuses, and non-transitory computer-readable medium described herein, the first encoded transmission includes a set of encoded packets, the assistance information includes an indication of one or more packets not successfully decoded in the decoding process, and the additional encoded transmission includes a retransmission of the one or more packets.

In some examples of the method, apparatuses, and non-transitory computer-readable medium described herein, the first encoded transmission includes a set of encoded packets, and the assistance information includes an indication that the decoding process was unsuccessful, and the additional encoded transmission includes one or more additional encoded packets based on the rateless code.

In some examples of the method, apparatuses, and non-transitory computer-readable medium described herein, receiving the configuration information may include operations, features, means, or instructions for receiving an indication of the set of portions of the respective durations.

In some examples of the method, apparatuses, and non-transitory computer-readable medium described herein, the set of portions of the respective durations may be preconfigured within the UE.

In some examples of the method, apparatuses, and non-transitory computer-readable medium described herein, the assistance information includes CSI for the additional encoded transmission.

In some examples of the method, apparatuses, and non-transitory computer-readable medium described herein, the rateless code includes a fountain code, a Luby transform code, a Raptor code, or a combination thereof.

A method of wireless communications at a base station is described. The method may include determining configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, transmitting, to a first UE and a second UE, the configuration information for communication of the set of data blocks, transmitting, in the first portion of a first duration via a broadcast message associated with a first data block, the first encoded transmission for the first data block, the first encoded transmission being encoded based on a rateless code, and receiving, from the first UE and the second UE during the second portion of the first duration indicated in the configuration information for reporting assistance information for the first encoded transmission, respective assistance information based on the first and second UEs attempting decoding processes for the first encoded transmission.

An apparatus for wireless communications at a base station is described. The apparatus may include a processor, memory coupled with the processor, and instructions stored in the memory. The instructions may be executable by the processor to cause the apparatus to determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, transmit, to a first UE and a second UE, the configuration information for communication of the set of data blocks, transmit, in the first portion of a first duration via a broadcast message associated with a first data block, the first encoded transmission for the first data block, the first encoded transmission being encoded based on a rateless code, and receive, from the first UE and the second UE during the second portion of the first duration indicated in the configuration information for reporting assistance information for the first encoded transmission, respective assistance information based on the first and second UEs attempting decoding processes for the first encoded transmission.

Another apparatus for wireless communications at a base station is described. The apparatus may include means for determining configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, transmitting, to a first UE and a second UE, the configuration information for communication of the set of data blocks, transmitting, in the first portion of a first duration via a broadcast message associated with a first data block, the first encoded transmission for the first data block, the first encoded transmission being encoded based on a rateless code, and receiving, from the first UE and the second UE during the second portion of the first duration indicated in the configuration information for reporting assistance information for the first encoded transmission, respective assistance information based on the first and second UEs attempting decoding processes for the first encoded transmission.

A non-transitory computer-readable medium storing code for wireless communications at a base station is described. The code may include instructions executable by a processor to determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof, transmit, to a first UE and a second UE, the configuration information for communication of the set of data blocks, transmit, in the first portion of a first duration via a broadcast message associated with a first data block, the first encoded transmission for the first data block, the first encoded transmission being encoded based on a rateless code, and receive, from the first UE and the second UE during the second portion of the first duration indicated in the configuration information for reporting assistance information for the first encoded transmission, respective assistance information based on the first and second UEs attempting decoding processes for the first encoded transmission.

Some examples of the method, apparatuses, and non-transitory computer-readable medium described herein may further include operations, features, means, or instructions for determining that the first UE failed to decode at least a portion of the first encoded transmission based on the respective assistance information, and transmitting, to the first UE, a first additional encoded transmission based on the determination.

Some examples of the method, apparatuses, and non-transitory computer-readable medium described herein may further include operations, features, means, or instructions for determining that the second UE failed to decode at least a portion of the first encoded transmission based on the respective assistance information, and transmitting, to the second UE, a second additional encoded transmission based on the determination.

In some examples of the method, apparatuses, and non-transitory computer-readable medium described herein, the first additional encoded transmission and the second additional encoded transmission include a MU-MIMO transmission.

Some examples of the method, apparatuses, and non-transitory computer-readable medium described herein may further include operations, features, means, or instructions for determining that the second UE failed to decode at least a portion of the first encoded transmission based on the respective assistance information, and transmitting the first additional encoded transmission in a multicast message to the first UE and the second UE.

In some examples of the method, apparatuses, and non-transitory computer-readable medium described herein, the first encoded transmission includes a set of encoded packets, and the assistance information includes an indication of one or more packets not successfully decoded by the first UE or the second UE, and the additional encoded transmission includes a retransmission of the one or more packets.

In some examples of the method, apparatuses, and non-transitory computer-readable medium described herein, the first encoded transmission includes a set of encoded packets, and the assistance information includes an indication that a decoding process at the first UE or the second UE was unsuccessful, and the additional encoded transmission includes one or more additional encoded packets based on the rateless code.

In some examples of the method, apparatuses, and non-transitory computer-readable medium described herein, transmitting the configuration information may include operations, features, means, or instructions for transmitting an indication of at least one of the set of portions.

Some examples of the method, apparatuses, and non-transitory computer-readable medium described herein may further include operations, features, means, or instructions for determining the set of portions based on one or more UE metrics for a set of UEs including the first UE and the second UE, the one or more UE metrics including an SNR for the set of UEs, a location of the set of UEs, CSI from the set of UEs, or a combination thereof.

In some examples of the method, apparatuses, and non-transitory computer-readable medium described herein, the assistance information includes an indication of whether a decoding process of the first encoded transmission at the first UE or the second UE may be complete or incomplete, missing packet information, CSI to be used for a unicast or a multicast transmission of the one or more encoded transmissions, or a combination thereof.

In some examples of the method, apparatuses, and non-transitory computer-readable medium described herein, the rateless code includes a fountain code, a Luby transform code, a Raptor code, or a combination thereof.

DETAILED DESCRIPTION

Figure 1:
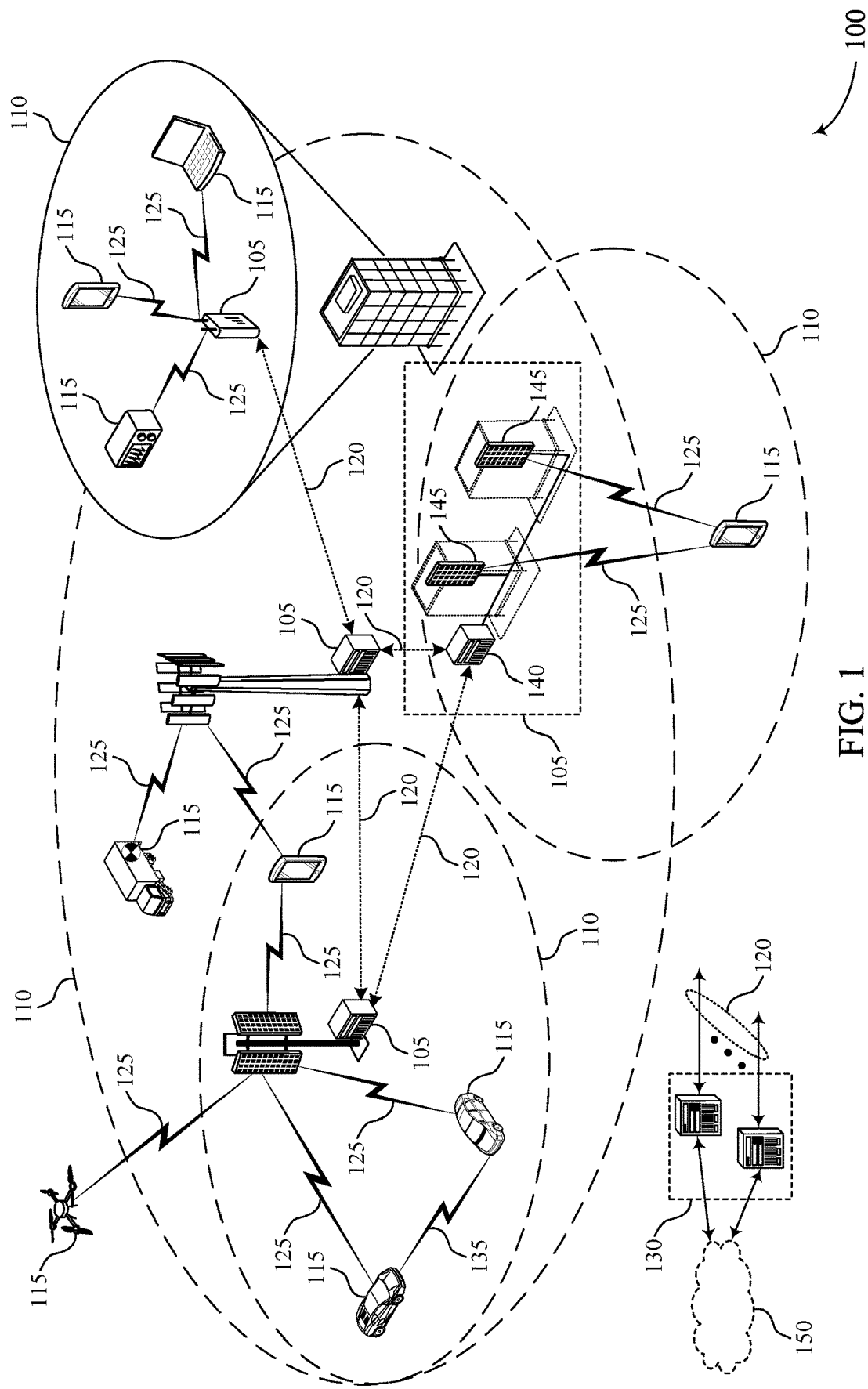
FIG. 1 illustrates an example of a system for wireless communications that supports joint broadcast and unicast design for multiple-input multiple-output (MIMO) systems in accordance with aspects of the present disclosure.

Different types of coding may be used to transmit encoded transmissions. For broadcast or multicast transmissions, a base station may broadcast encoded information (e.g., encoded symbols or packets) according to a rate supporting a receiving device (e.g., user equipment (UE)) having a lowest channel geometry (e.g., lowest signal to noise ratio (SNR)). In some cases, the base station may use a rateless code. Rateless codes may not have an inherent code rate, and may be used to generate encoded information (e.g., encoded symbols or packets) indefinitely from a data block. Rateless codes include fountain codes, Luby transform codes, Raptor codes, etc. Each receiving device may then decode the transmission with a different amount of encoded information and thus devices with higher channel geometries may finish decoding the transmission early. However, broadcast inhibits the use of multiple input multiple output (MIMO) precoding to improve SNR at the receiving devices, and thus reduces efficiency of the transmission to each receiving device. In addition, decoding may stall for rateless codes. Stalling of decoding for rateless codes is likely caused by certain missing or corrupt packets. The stalled decoding may eventually converge with additional encoded information, but the amount of encoded information may increase substantially in the absence of the packet causing the decoding to stall.

As described herein, a base station may first transmit an encoded transmission of a data block via a broadcast. If a UE is unable to fully receive/decode the broadcasted encoded transmission, the UE transmits assistance information to the base station. Accordingly, the base station may then transmit an additional encoded transmission to the UE via a unicast or multicast message based on the assistance information. In some cases, the assistance information may include an indication of whether the decoding process of the broadcasted transmission is complete or incomplete, missing packet information, channel state information to be used for a unicast or a multicast transmission of the encoded transmission, or a combination thereof. Additionally, the base station may transmit configuration information for the UE to receive the broadcast encoded transmission and the unicast/multicast transmission. For example, the configuration information may include information indicating durations of portions of the encoded transmission transmitted via the broadcast, via the unicast, when to transmit the assistance information, etc. The information may be based on UE statistics (e.g., SNR, location, channel state information (CSI), geometry statistics, etc.). Additionally or alternatively, some or all of the information may be preconfigured in the UE based on a frame or other transmission time interval (TTI) length, etc.

Aspects of the disclosure are initially described in the context of wireless communications systems. Additionally, aspects of the disclosure are illustrated through an additional wireless communications system, a transmission timeline, coding scheme examples, and a process flow. Aspects of the disclosure are further illustrated by and described with reference to apparatus diagrams, system diagrams, and flowcharts that relate to joint broadcast and unicast design for MIMO systems.

FIG. 1 illustrates an example of a wireless communications system 100 that supports joint broadcast and unicast design for MIMO systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

For broadcast or multicast transmissions, a base station may broadcast encoded information (e.g., encoded symbols or packets) according to a rate supporting a receiving device (e.g., UE) having a lowest channel geometry (e.g., lowest SNR). In some cases, the base station may use a rateless code. Each receiving device may then decode the transmission with a different amount of encoded information and thus devices with higher channel geometries may finish decoding the transmission early. However, broadcast inhibits the use of MIMO precoding to improve SNR at the receiving devices, and thus reduces efficiency of the transmission to each receiving device. In addition, decoding may stall for rateless codes. Stalling of decoding for rateless codes is likely caused by certain missing or corrupt packets. The stalled decoding may eventually converge with additional encoded information, but the amount of encoded information may increase substantially in the absence of the packet causing the decoding to stall.

Wireless communications system 100 may support efficient techniques for a joint broadcast and unicast/multicast design for transmitting encoded transmissions between a base station 105 and a UE 115. For example, the base station 105 may transmit a first encoded transmission to multiple UEs 115 via a broadcast. Subsequently, the multiple UEs 115 may transmit assistance information to the base station 105 based on attempting to decode the first encoded transmission. In some cases, the assistance information may include an indication of whether the first encoded transmission was successfully decoded or not, missing packet information, CSI, etc. If at least one of the multiple UEs 115 unsuccessfully decoded the first encoded transmission, the base station 105 may then transmit an additional encoded transmission to the UEs 115 that were unable to successfully decode the first encoded transmission, where the additional encoded transmission is transmitted via unicast or multicast. In some cases, the base station 105 may transmit configuration information for the broadcast and unicast/multicast design to the multiple UEs 115 (e.g., configurations for the durations/portions of the broadcast, assistance information, unicast/multicast, etc.).

Figure 2:
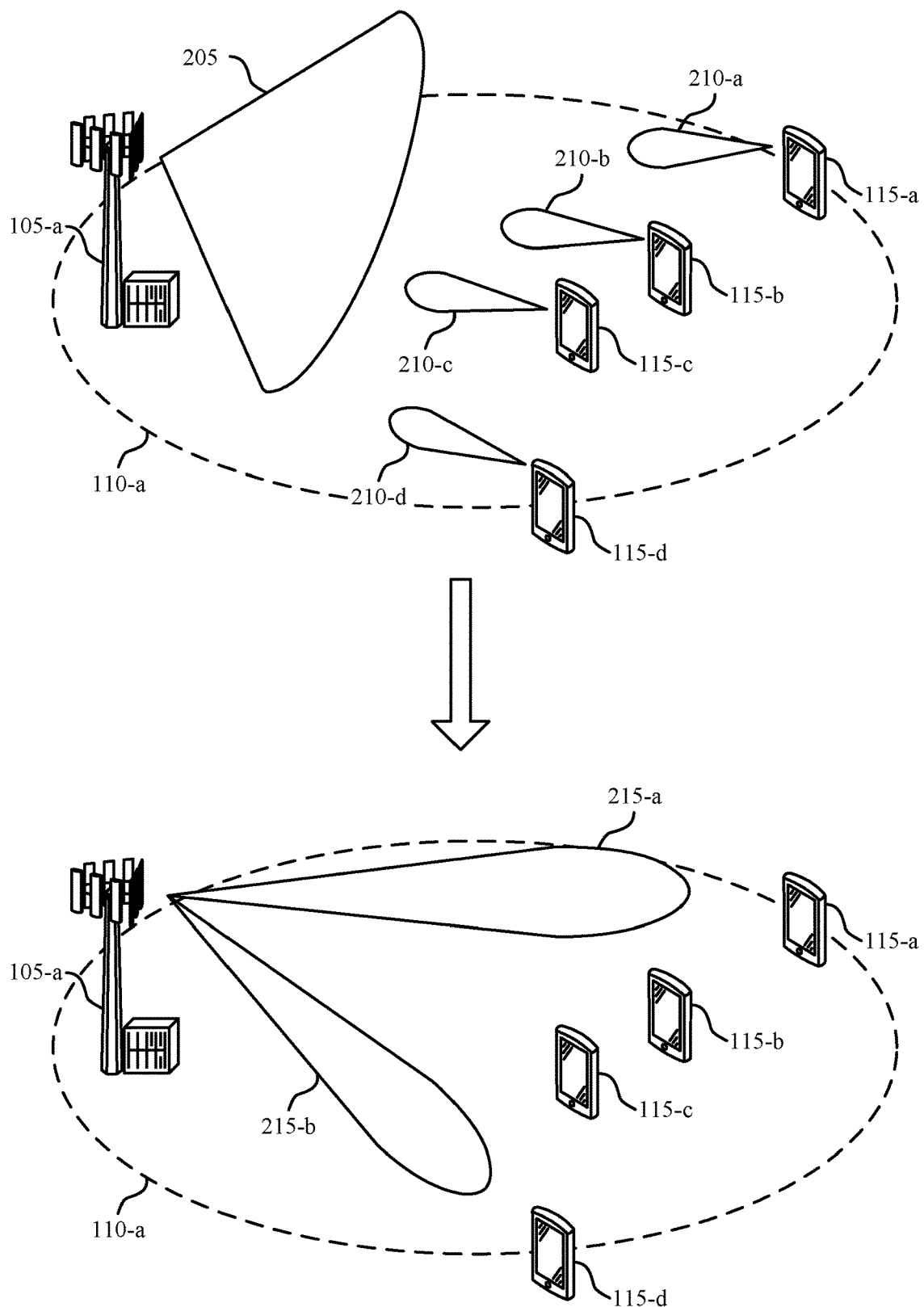
FIG. 2 illustrates an example of a wireless communications system that supports joint broadcast and unicast design for MIMO systems in accordance with aspects of the present disclosure.

FIG. 2 illustrates an example of a wireless communications system 200 that supports a joint broadcast and unicast design for MIMO systems in accordance with aspects of the present disclosure. In some examples, wireless communications system 200 may implement aspects of wireless communications system 100. For example, wireless communications system 200 may include a base station 105-*a*, a UE 115-*a*, a UE 115-*b*, a UE 115-*c*, and a UE 115-*d*, which may be examples of corresponding base stations 105 and UEs 115, respectively, as described above with reference to FIG. 1.

Additionally, in some cases, the different UEs 115 in wireless communications system 200 may include classifications based on how far the UEs 115 are from base station 105-*a*. For example, base station 105-*a* may include a coverage area 110-*a* that represents how far base station 105-*a* is able to effectively communicate with wireless devices in wireless communications system 200 (e.g., a wireless device located in coverage area 110-a may be able to communicate with base station 105-a). Depending on where the UEs 115 are located in coverage area 110-a and with respect to base station 105-a, the UEs 115 may be classified as cell center UEs 115, cell edge UEs 115, or classifications between cell center and cell edge not used herein. For example, UE 115-a and UE 115-d may be located on the outer edge of coverage area 110-a and, thus, may be referred to as cell edge UEs 115. Additionally or alternatively, UE 115-b and UE 115-c may be located closer to base station 105-a and towards the center of coverage area 110-a and, thus, may be referred to as cell center UEs 115.

In some cases, communications with cell edge UEs 115 may be more difficult based on signal degradation as transmissions are sent over farther distances for the cell edge UEs 115 than for transmissions sent to cell center UEs 115. Additionally or alternatively, transmissions with cell edge UEs 115 may be prone to more interference or signal blockage based on higher chances that other signals or physical impediments get in the way of the transmissions with the greater distance between base station 105-a and the cell edge UEs 115. However, even with these issues for cell edge UEs 115, the expanse of coverage area 110-a may be considered a benefit for providing coverage to a greater number of UEs 115 than would be able to receive communications with a smaller, if not more reliable coverage area. Accordingly, efficient techniques may be desired for enhancing communications from base station 105-a for improving system capacity while supporting the coverage of cell edge users (e.g., cell edge UEs 115).

Additionally, communications between base station 105-a and the UEs 115 may be encoded to enable secure data transmissions, for introducing redundancy in a codeword so that transmission errors may be detected and corrected, etc. For example, base station 105-a and/or the UEs 115 may use rateless codes for transmissions. The rateless code may include no fixed code rate before transmission. For example, a rateless code may have infinite columns in a generator matrix, and thus the code may be used to infinitely generate encoded packets. In some cases, the rateless code may be a fountain code (e.g., a type of rateless code), which may be suitable for broadcast information such as multimedia broadcast multicast services (MBMS). With fountain codes, base station 105-a may firstly divide the information to be transmitted into multiple packets. Subsequently, a symbol used to transmit the multiple packets (e.g., transmitted symbol) may include an XOR-ed version of different packets (e.g., an encoded signal based on the fountain codes). A receiver of the packets (e.g., the UEs 115) may use different procedures or algorithms (e.g., gaussian elimination (GE), belief propagation (BP), etc.) to decode the transmitted packets and to recover the information.

For broadcast systems, users (e.g., both the cell center UEs 115 and the cell edge UEs 115) may receive a same packet from base station 105-a at a same time. By transmitting the same packet(s) to all UEs 115 at the same time, base station 105-a may be inhibited from using MIMO precoding, and thus SNR may not be improved to individual UEs. Additionally, when using fountain codes within a broadcast system, issues may arise. Although the cell center UEs 115 (e.g., cell center users) may decode the broadcasted packet with a low block error ratio (BLER), the cell edge UEs 115 (e.g., cell edge UEs 115) may have a low SNR. Additionally, although encoded information generated from the fountain codes may be transmitted continually, in some cases a specific packet may stall decoding of the fountain code. For example, for a GE decoder, the decoding may stall at a given packet, and a substantial amount of additional encoded information may be received before decoding proceeds successfully unless the given packet is retransmitted.

As described herein, base station 105-a and the UEs 115 may support a joint broadcast and unicast/multicast design (e.g., for MIMO and MBMS). For example, the joint broadcast and unicast/multicast design may include a single duration for transmitting a data block from base station 105-a to the UEs 115 that includes both a broadcast transmission 205 of encoded information of the data block and unicast/multicast transmissions 215 of encoded information of the data block. In some cases, the broadcast transmission 205 and the unicast/multicast transmissions 215 may be portions of the single duration or may be individual durations for the joint broadcast and unicast/multicast design. Additionally, the broadcast transmission 205 and the unicast/multicast transmissions 215 may be encoded based on a rateless code (e.g., the fountain code described above, a Luby transform code, a Raptor code, etc.).

As part of the joint broadcast and unicast/multicast design, base station 105-a may transmit configuration information for the design to the UEs 115 prior to transmitting a set of data blocks. For example, the configuration information may include lengths of time that base station 105-a transmits each of the set of data blocks via the broadcast transmissions 205, via the unicast/multicast transmissions 215, etc. (e.g., different portions of the joint broadcast and unicast/multicast design). In some cases, base station 105-a may determine and configure the lengths of time for the broadcast transmission 205 and the unicast/multicast transmissions 215 based on UE statistics of the UEs 115, such as SNRs of the UEs 115, location of the UEs 115, CSI reports, etc. For example, if a higher number of cell center UEs 115 are located in coverage area 110-a, the lengths of time for the broadcast transmission 205 may be shorter than if a higher number of cell edge UEs 115 are present (e.g., higher numbers of cell center UEs 115 may result in quicker and more successful decodes, while a longer duration for unicast/multicast transmissions may allow additional SNR gain for individual UEs for the unicast/multicast transmissions). Additionally or alternatively, if the UEs 115 have concentrated geometry statistics, then the length of time for the broadcast transmission 205 may be configured for the highest concentration of UEs 115 to successfully receive the broadcast transmission 205. In some cases, the geometry statistics may include a histogram of similar SNRs for the UEs 115, such that if a majority of the UEs 115 are centered around similar SNRs, the length of time for the broadcast transmission 205 may be determined according to the concentration of SNRs, whereas if the UEs 115 are spread out among the SNRs, the length of time for the broadcast transmission 205 may be determined according to other considerations (e.g., a number of UEs likely to fail to decode the broadcast transmission).

Additionally or alternatively, the lengths of time for the broadcast transmission 205 and the unicast/multicast transmissions 215 may be preconfigured in the UEs 115. For example, the length of time for the broadcast transmission 205 in relation to a frame length (e.g., the single duration of the joint broadcast and unicast/multicast design) may be preconfigured to the UEs 115.

After transmitting the configuration information for the joint broadcast and unicast/multicast design, base station 105-a may then transmit the broadcast transmission 205 to the UEs 115 according to the configuration information. For example, each data block may be broadcast in a broadcast transmission 205 during the broadcast portion of a time duration (e.g., a TTI, a frame, a subframe, a slot). In some cases, the broadcast transmission 205 may represent a first portion (e.g., first step) for the joint broadcast and unicast/multicast design.

Subsequently, each of the UEs 115 may attempt to decode the received broadcast transmission 205 (e.g., which has been encoded based on a rateless code). Accordingly, each of the UEs 115 may report assistance information to base station 105-a in an uplink message 210. For example, each UE 115-a may transmit a respective uplink message 210 carrying the assistance information, such that UE 115-a transmits an uplink message 210-a, UE 115-b transmits an uplink message 210-b, UE 115-c transmits an uplink message 210-c, and UE 115-d transmits an uplink message 210-d. In some cases, the assistance information in each uplink message 210 may include an indication of a completion or incompletion of decoding the broadcast transmission 205 for the UE 115 transmitting the uplink message 210, missing packet information (e.g., a symbol index that halted the UE 115 decoding fountain codes), CSI (e.g., to be used for the unicast/multicast transmissions 215), or a combination thereof. Alternatively, only UEs which fail to decode the received broadcast transmission 205 may transmit assistance information in uplink messages 210.

Additionally, each of the UEs 115 may transmit their respective uplink messages 210 carrying the assistance information after the length of time for the broadcast transmission 205 (e.g., broadcast time) indicated in the configuration information for the joint broadcast and unicast/multicast design. In some cases, the assistance information and uplink messages 210 may represent a second portion (e.g., second step) for the joint broadcast and unicast/multicast design. Additionally, a length of time for the UEs 115 to transmit the assistance information and uplink messages 210 (e.g., and other resource allocation information) may be included in the configuration information for the joint broadcast and unicast/multicast design. In some cases, the UEs 115 may transmit the uplink messages 210 using an uplink feedback allocation of resources (e.g., a preconfigured physical uplink shared channel (PUSCH), multiplexed with other uplink information, etc.).

If at least one of the UEs 115 indicates that the broadcast transmission 205 for a data block was unsuccessfully decoded (e.g., in a respective uplink message 210 and assistance information), base station 105-a may then transmit additional encoded information for the data block (e.g., the same or additional fountain code symbols) in one of the unicast/multicast transmissions 215. In some cases, the unicast/multicast transmissions 215 may include multiple user MIMO (MU-MIMO) transmissions (e.g., with unicast transmission). Additionally or alternatively, the unicast/multicast transmissions 215 may include beamformed transmissions with target packets based on the assistance information (e.g., UE reports from the uplink messages 210). Thus, SNR for the unicast/multicast transmissions 215 may be improved over the broadcast transmission 205.

As shown, based on the assistance information transmitted in the uplink messages 210, base station 105-a may determine to transmit a first unicast/multicast transmission 215-a to UE 115-a and a second unicast/multicast transmission 215-b to UE 115-d (e.g., based on UE 115-a and UE 115-d not fully or successfully decoding the broadcast transmission 205 as indicated in their respective uplink messages 210-a and 210-d carrying the corresponding assistance information from the cell edge UEs 115). In some cases, the unicast/multicast transmissions 215 may represent a third portion (e.g., third step) for the joint broadcast and unicast/multicast design.

In some cases, the first unicast/multicast transmission 215-a and the second unicast/multicast transmission 215-b may be separate unicast transmissions to each UE 115, a multicast transmission transmitted to both UEs 115, or a combination thereof. For example, the assistance information may include the missing packet information from the respective UEs 115, indicating which parts of the broadcast transmission 205 were unsuccessfully received/decoded. As such, base station 105-a may determine to transmit the parts missed by a UE 115 to that UE 115 specifically (e.g., via a unicast transmission). Additionally or alternatively, if multiple UEs 115 missed similar parts of the broadcast transmission 205, base station 105-a may transmit a same encoded transmission to the multiple UEs 115 (e.g., via a multicast transmission). In some cases, base station 105-a may transmit both unicast transmissions and multicast transmissions if needed.

Based on using the joint broadcast and unicast/multicast design as described above (e.g., a joint broadcast and unicast/multicast for broadcast service), system capacity may be improved with guaranteeing coverage for cell edge UEs 115. Additionally, the assistance information (e.g., UE feedback, user feedback, etc.) may be used to further improve network efficiency. For example, by reporting a specific symbol index for the rateless code used for the broadcast transmission (e.g., Luby transform, Raptor code, fountain codes, etc.) may improve decoding performance of the UEs 115.

Figure 3:
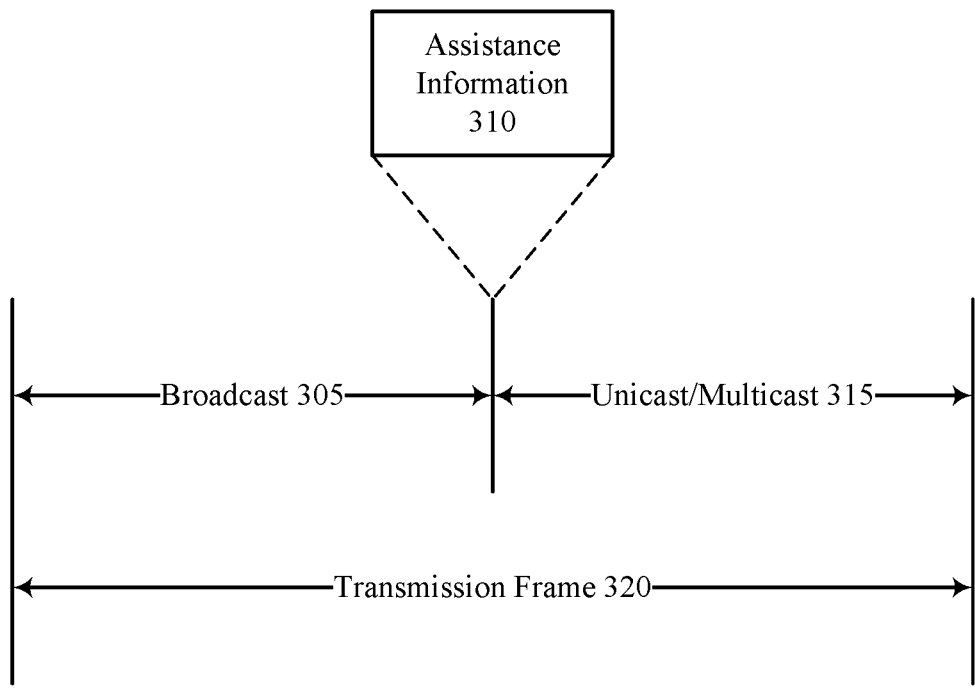
FIG. 3 illustrates an example of a transmission timeline that supports joint broadcast and unicast design for MIMO systems in accordance with aspects of the present disclosure.

FIG. 3 illustrates an example of a transmission timeline 300 that supports a joint broadcast and unicast design for MIMO systems in accordance with aspects of the present disclosure. In some examples, transmission timeline 300 may be implemented by aspects of wireless communications systems 100 and/or 200. For example, a UE 115 and a base station 105 may use transmission timeline 300 as part of a joint broadcast and unicast/multicast design as described above with respect to FIG. 2.

The base station 105 may first transmit a first encoded transmission over broadcast portion 305 of transmission frame 320 (e.g., broadcast of information generated using a fountain code or a different type of rateless code). Transmission frame 320 may represent, for example, a TTI, frame, subframe, or slot for an MBMS scheme.

Subsequently, the UE 115 may then attempt to decode the first encoded transmission. Accordingly, the UE 115 may transmit assistance information to the base station 105 in a feedback portion 310 of transmission frame 320. In some cases, transmission frame 320 may have a gap between broadcast portion 305 and feedback portion 310 to allow UEs 115 to complete a decoding process (which may be successful or unsuccessful) for the first encoded transmission. The UE 115 may report the assistance information to enable a subsequent unicast/multicast transmission to be transmitted from the base station 105 in unicast/multicast portion 315. In some cases, the assistance information transmitted in the unicast/multicast portion 315 may include an indication of a completion or success of decoding the first encoded transmission received within broadcast portion 305 (e.g., positive acknowledgment (ACK) or negative acknowledgment (NACK) feedback, where an ACK indicates successful decoding and a NACK indicates an unsuccessful decoding), missing packet information, CSI, etc. If the assistance information indicates the UE 115 (e.g., and/or additional UEs 115) failed to decode the first encoded transmission received within broadcast portion 305, the base station 105 may then transmit an additional encoded transmission in the unicast/multicast portion 315 (e.g., the same or additional packets from a fountain code or a different type of rateless code) based on the assistance information 310.

Additionally, the broadcast portion 305, feedback portion 310, and the unicast/multicast portion 315 may occur within each of multiple transmission frames 320, where each of the broadcast 305, the assistance information 310, and the unicast/multicast 315 may represent different portions of the transmission frames 320. In some cases, the transmission frame 320 may represent a single transmission frame for MBMS. Additionally or alternatively, the transmission frame 320 may represent a TTI allocated for a different type of service, may last different lengths of time, etc.

Figure 4:
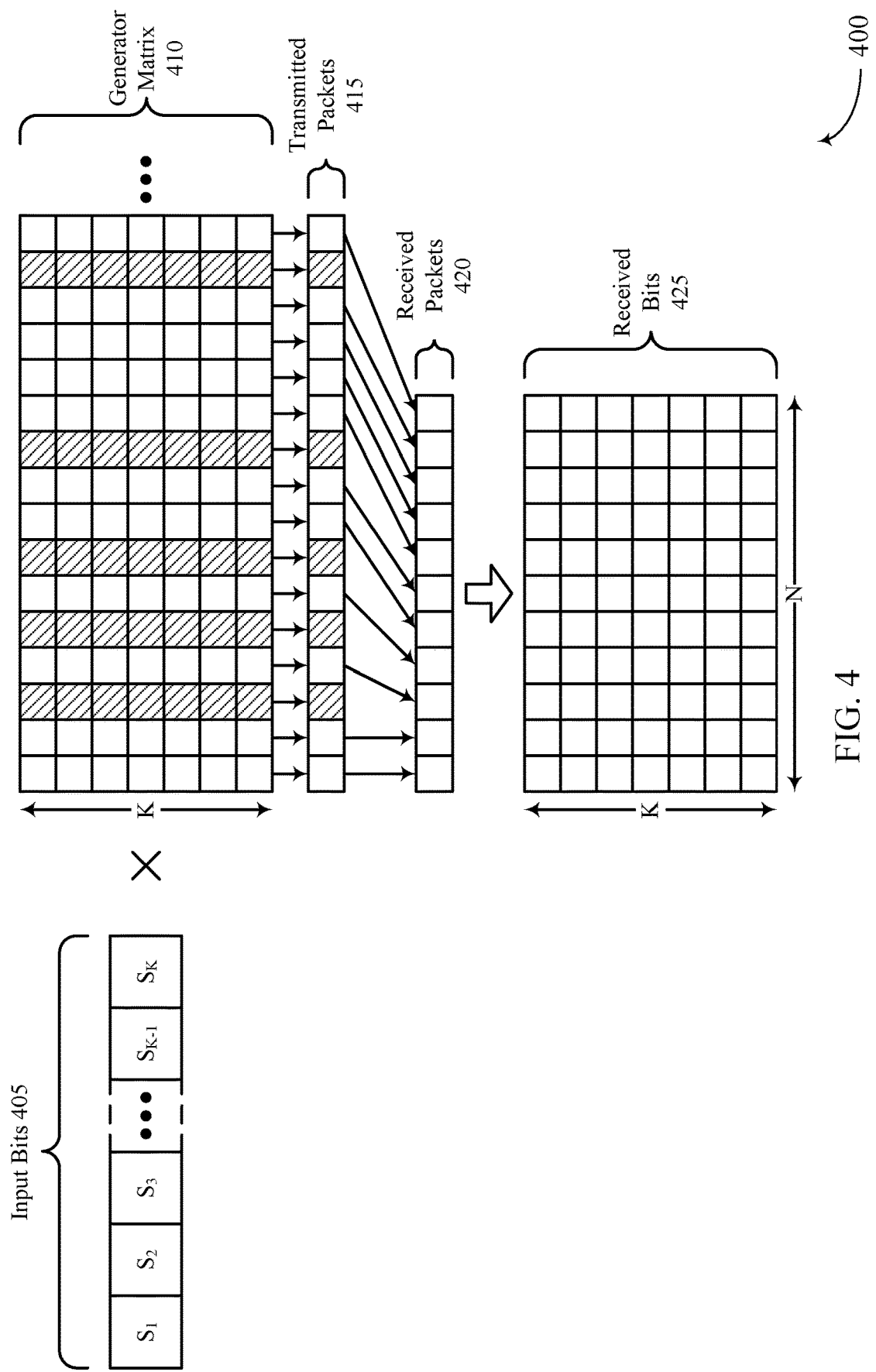
FIGS. 4, 5, and 6 illustrate examples of coding schemes that support joint broadcast and unicast design for MIMO systems in accordance with aspects of the present disclosure.

FIG. 4 illustrates an example of a coding scheme 400 that supports a joint broadcast and unicast design for MIMO systems in accordance with aspects of the present disclosure. In some examples, coding scheme 400 may be implemented by aspects of wireless communications systems 100 and/or 200. For example, coding scheme 400 may represent a rateless code that can be used by a base station 105 and a UE 115 as part of a joint broadcast and unicast/multicast design as described herein. In particular, coding scheme 400 may represent a fountain code. Fountain codes may be rateless codes with unlimited columns of a generator matrix.

An encoder (e.g., the base station 105) may take a set of input bits 405 (e.g., raw information to be transmitted) to use for the fountain code generation. For example, the input bits 405 may be represented as $\{s_1, s_2, s_3, \ldots, s_{K-1}, s_K\}$. The encoder may then multiply the input bits 405 by a generator matrix 410. The height (e.g., number of rows) of the generator matrix 410 may depend on the number of input bits 405 (e.g., K input bits), and the width (e.g., number of columns) of the generator matrix 410 may be unlimited (e.g., infinite).

Subsequently, after multiplying the input bits 405 with the generator matrix 410, the encoder may be left with a number of transmitted packets 415. For example, the transmitted packets 415 may be represented by $p_j = \Sigma_{k=1}^{K} s_k G_{kj}$, where $s_k$ is the input bits 405 and $G_{kj}$ is the generator matrix 410. In some cases, one or more of the transmitted packets 415 may be discarded or omitted based on the generator matrix 410.

Accordingly, a decoder may recover a set of received packets 420 based on the transmitted packets 415 with the discarded/omitted packets. For example, the received packets 420 may be represented by $d_k = \Sigma_{n=1}^{N} p_n G_{nk}^{-1}$, where $p_n$ is the transmitted packets 415 and $G_{nk}$ is a matrix of received bits 425 from the received packets 420. In some cases, a condition of recovering the input bits 405 from the received packets 420 may be that the generator matrix, $G_{nk}$, according to the received packets 420 may be invertible, the rank of $G_{nk}$ may be K, or a combination thereof. Additionally, as a design rule for the generator matrix 410 (e.g., original generator matrix), $G_{nk}$ may be invertible with minimum N. For example, an initial broadcast transmission may be determined using a generator matrix, $G_{nk}$, that may be invertible according to the transmitted packets 415. If the initial broadcast transmission is not decoded correctly at a UE 115, the base station 105 may retransmit some of the transmitted packets, or may generate and transmit additional columns from the generator matrix 410. Thus, an overall code rate for each UE 115 may be variable according to the channel conditions of the UE 115.

Figure 5:
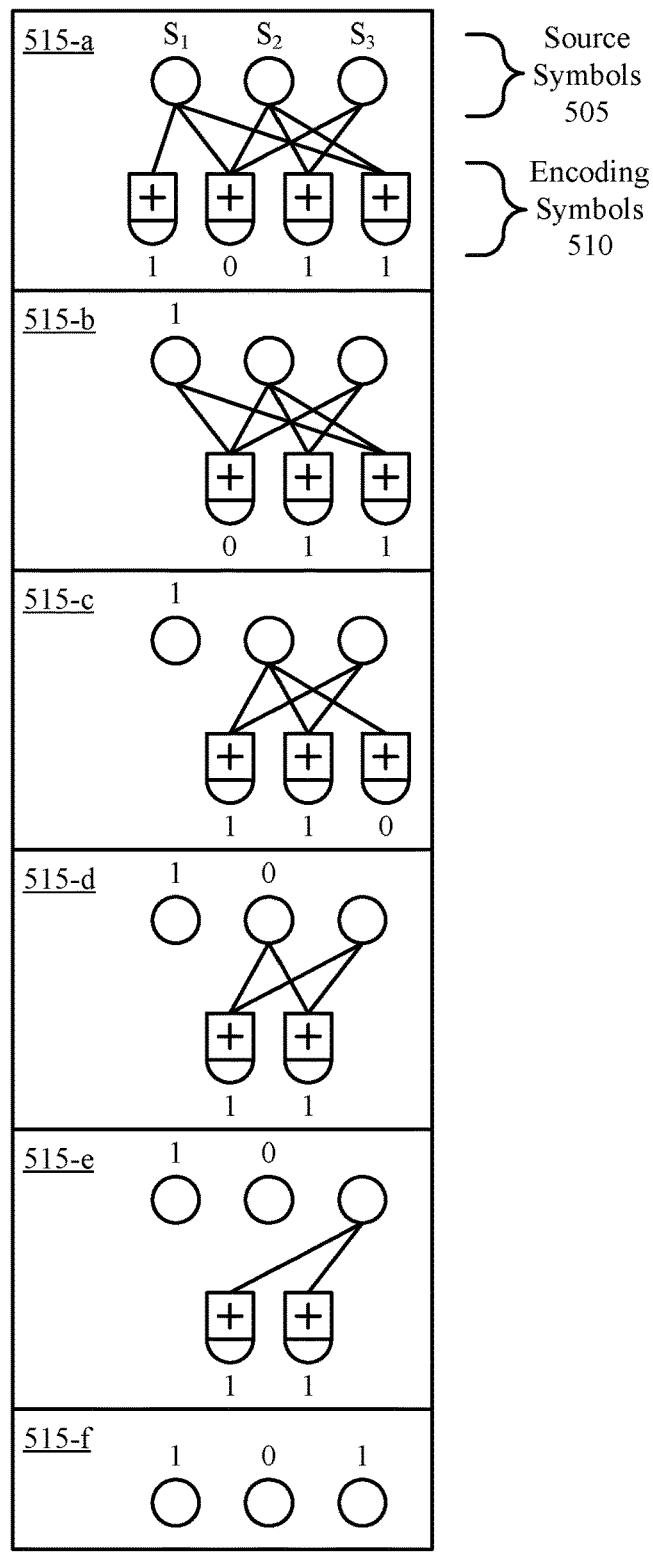

FIG. 5 illustrates an example of a coding scheme 500 that supports a joint broadcast and unicast design for MIMO systems in accordance with aspects of the present disclosure. In some examples, coding scheme 500 may be implemented by aspects of wireless communications systems 100 and/or 200. For example, coding scheme 500 may represent a rateless code that can be used by a base station 105 and/or a UE 115 as part of a joint broadcast and unicast/multicast design as described herein. In particular, coding scheme 500 may represent a Luby transform code. Luby transform codes may be used as an efficient method for realizing a function of fountain codes.

An encoder (e.g., the base station 105) may use coding scheme 500 to transmit a set of source symbols 505 based on one or more encoding symbols 510. The encoder may perform an encoding process for each encoding symbol 510. In some cases, the encoding process may include the encoder randomly choosing a degree, $d_i$, from a degree distribution. Subsequently, the encoder may randomly choose $d_i$ distinct source symbols and XOR them.

A decoder (e.g., the UE 115) may then perform a decoding process (e.g., BP algorithm) on received symbols from the encoder to determine the source symbols 505 that have been encoded. For example, the decoding process may include the decoder finding an encoding symbol 510 ($t_j$) that is connected to only one source symbol 505 ($s_i$). The decoding process may include different steps for determining this single connection between the encoding symbol 510 ($t_j$) and the source symbol 505 ($s_i$). In a first step, the decoder may set $s_i = t_j$. Subsequently, a second step may include the decoder XOR-ing $s_i$ to all encoding symbols 510 that are connected to $s_i$. Then, in a third step, the decoder may remove all the edges connected to the source symbol 505, $s_i$. The encoder may then repeat these steps until all $s_i$ are determined.

As shown, at 515-a, the decoder may receive the source symbols 505 from the encoder and may determine the possible connections between the source symbols 505 and the encoding symbols 510. At 515-b, the decoder may perform the first step as described above to set $s_1 = t_1$, such that $s_1 = 1$ based on the single connection between $s_1$ and $t_1$. Subsequently, at 515-c, the decoder may perform the second and third steps as described above to XOR $s_1$ to the encoding symbols connected to $s_1$ (e.g., XOR $t_2$ and XOR $t_4$, where $t_2$ and $t_4$ are the two encoding symbols connected to $s_1$ after the edges connected to $s_1$ have been removed), such that $t_2 = 1$ and $t_4 = 0$ after the XOR-ing.

At 515-d, the decoder may repeat the first step as described above to set $s_2 = t_4$, such that $s_2 = 0$ based on the single connection between $s_2$ and $t_4$ (e.g., see 515-c). Subsequently, at 515-e, the decoder may perform the second and third steps as described above to XOR $s_2$ to the encoding symbols connected to $s_2$ (e.g., 0 XOR $t_2$ and 0 XOR $t_3$, where $t_2$ and $t_3$ are the two encoding symbols connected to $s_2$ after the edges connected to $s_2$ have been removed), such that $t_2 = 1$ and $t_3 = 1$ still after the XOR-ing. At 515-f, the decoder may repeat the first step as described above to $s_3 = t_2 = t_3$, such that $s_3 = 1$ based on the single connections between $s_3$ and $t_2$ and between $s_3$ and $t_3$ (e.g., see 515-e). Accordingly, the encoder may then determine the source symbols 505 are $\{1\ 0\ 1\}$ after performing the decoding process as described above based on the Luby transform code (e.g., using a BP algorithm). Additionally or alternatively, the decoder may perform the decoding process using different algorithms with different complexities (e.g., GE algorithm)

Figure 6:
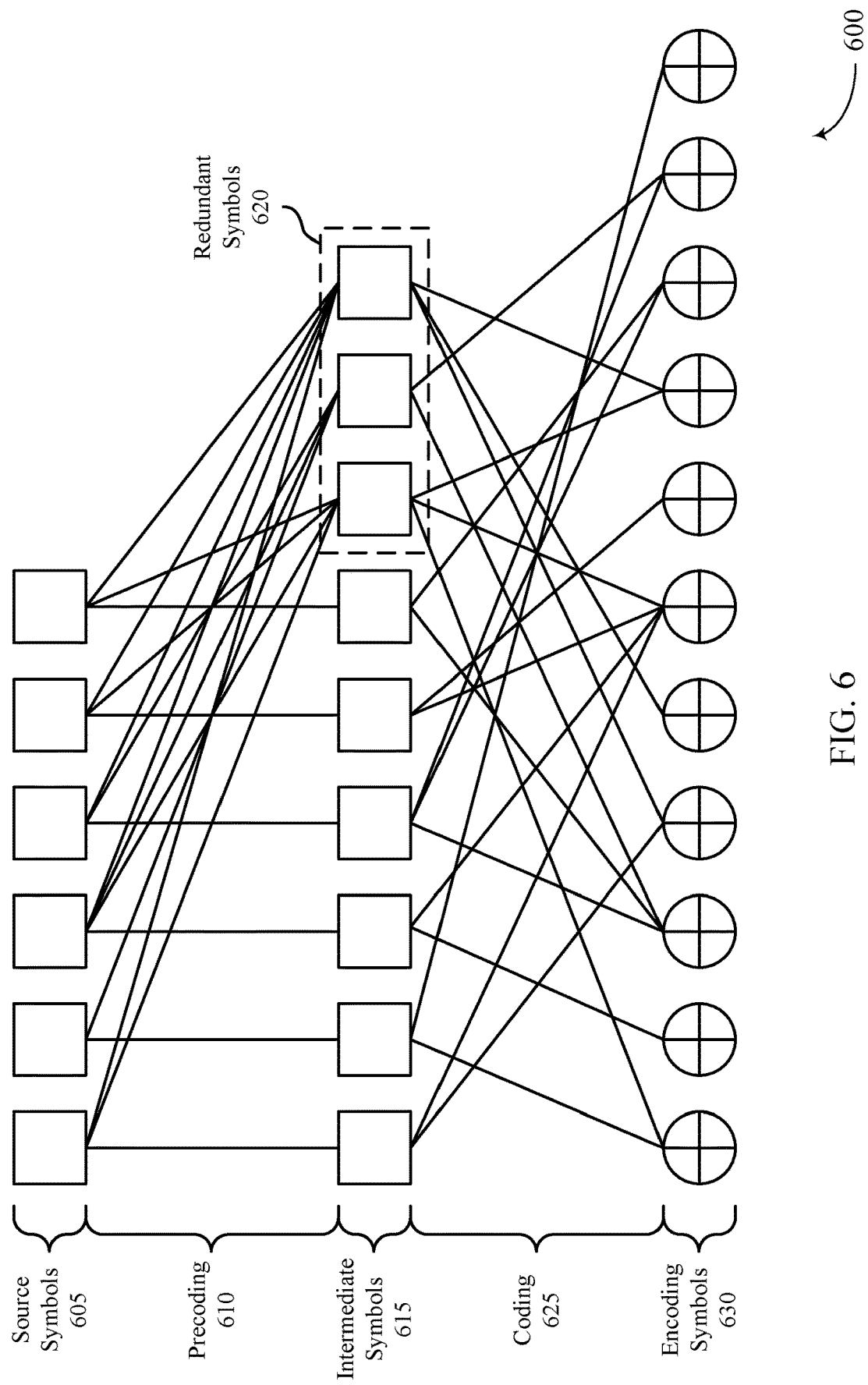

FIG. 6 illustrates an example of a coding scheme 600 that supports a joint broadcast and unicast design for MIMO systems in accordance with aspects of the present disclosure. In some examples, coding scheme 600 may be implemented by aspects of wireless communications systems 100 and/or 200. For example, coding scheme 600 may represent a rateless code that can be used by a base station 105 and a UE 115 as part of a joint broadcast and unicast/multicast design as described herein. In particular, coding scheme 600 may represent a Raptor code. Raptor codes may reduce encoding and decoding complexities of Luby transform codes by reducing an average degree used for the encoding and decoding.

An encoder (e.g., the base station 105) may use coding scheme 600 to transmit a set of source symbols 605 based on one or more encoding symbols 630. Before transmitting the encoding symbols 630, the encoder may use a precoding 610 process. The precoding 610 may generate a set of intermediate symbols 615. Additionally, the precoding 610 may also generate one or more redundant symbols 620. For example, S low-density parity-check (LDPC) symbols may be generated as part of the precoding 610 including the redundant symbols 620 (e.g., each source symbol 605 may appear three (3) times in all LDPC symbols), H half symbols may be generated as part of the precoding 610 including the redundant symbols 620 (e.g., each encoding symbol 630 contains ceil(H/2) source symbols 605). In some cases, the precoding 610 may use a different type of encoding process.

After the precoding 610, the encoder may then take the intermediate symbols 615 (e.g., including the redundant symbols 620) and perform a coding 625 process. The coding 625 may include an encoding process for each of the encoding symbols 630. For example, the coding 625 may include similar steps as the coding scheme 500 as described above (e.g., for Luby transform coding). For example, the encoder may randomly choose a degree, $d_i$, from a degree distribution and may choose $d_i$ distinct source symbols and XOR them. Subsequently, the encoder may then transmit the encoding symbols 630 to a decoder (e.g., the UE 115).

Figure 7:
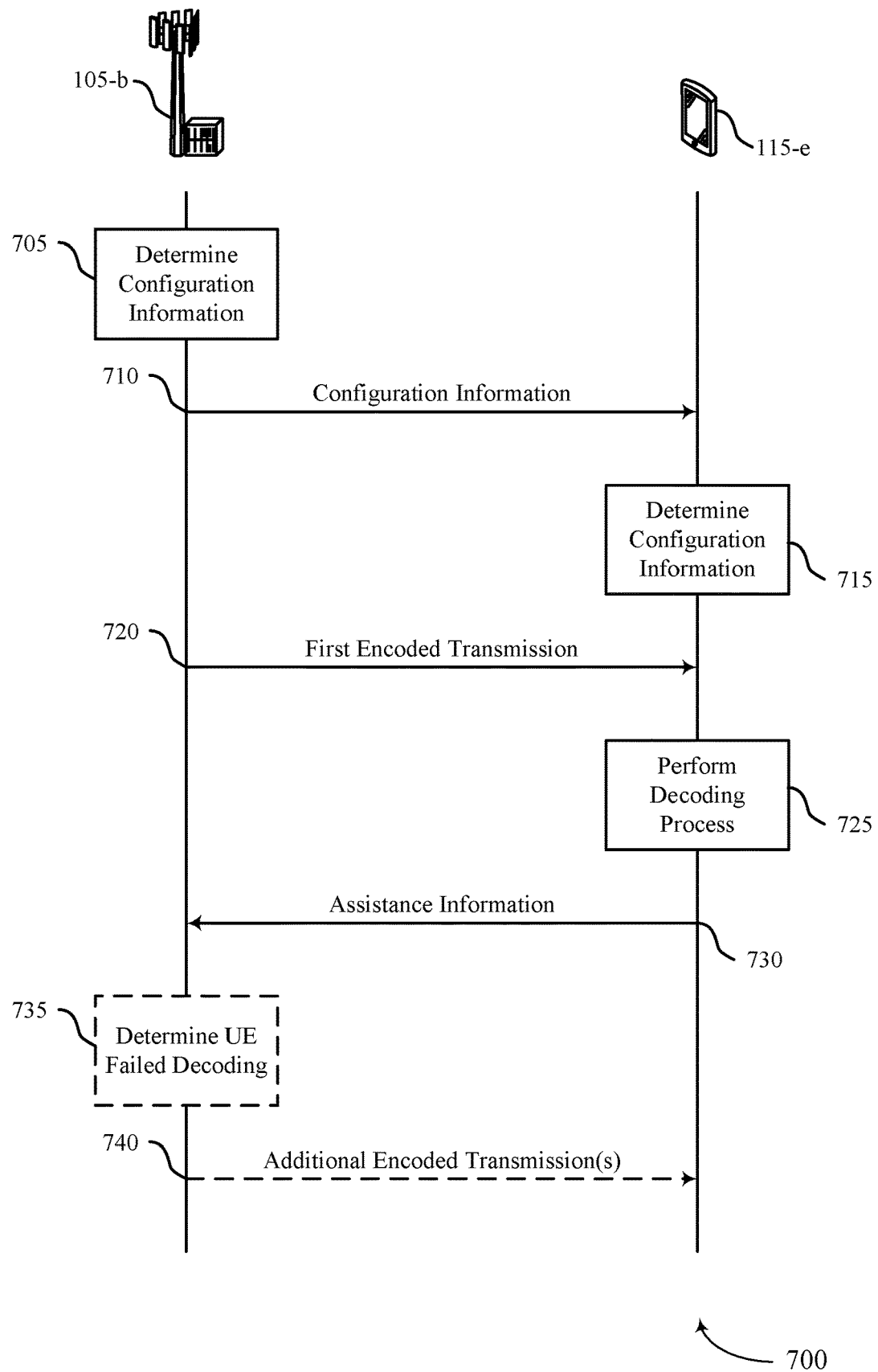
FIG. 7 illustrates an example of a process flow that supports joint broadcast and unicast design for MIMO systems in accordance with aspects of the present disclosure.

FIG. 7 illustrates an example of a process flow 700 that supports a joint broadcast and unicast design for MIMO systems in accordance with aspects of the present disclosure. In some examples, process flow 700 may be implemented by aspects of wireless communications systems 100 and/or 200. For example, process flow 700 may include a base station 105-b and a UE 115-e, which may be examples of corresponding base stations 105 and UEs 115, respectively, as described above with reference to FIGS. 1-6.

In the following description of the process flow 700, the operations between UE 115-e and base station 105-b may be performed in different orders or at different times. Certain operations may also be left out of the process flow 700, or other operations may be added to the process flow 700. It is to be understood that while UE 115-e and base station 105-b are shown performing a number of the operations of process flow 700, any wireless device may perform the operations shown.

At 705, base station 105-b may determine configuration information for communication of a plurality of data blocks in a plurality of respective durations, the configuration information including a plurality of portions of each of the respective durations that includes a first portion for communication of a first encoded transmission via broadcast, a second portion for reporting assistance information for the first encoded transmission, a third portion for communication of an additional encoded transmission via unicast or multicast, or a combination thereof. In some cases, base station 105-b may determine the plurality of portions based on one or more UE metrics for a set of UEs 115 (e.g., including at least UE 115-e and a second UE1 115), where the one or more UE metrics include an SNR for the set of UEs, a location of the set of UEs, CSI from the set of UEs, or a combination thereof.

At 710, UE 115-e may receive, from base station 105-b, the configuration information for communication of the plurality of data blocks in the plurality of respective durations.

At 715, UE 115-e may determine, based on the configuration information, the plurality of portions of each of the respective durations including at least the first portion, the second portion, the third portion, or a combination thereof. In some cases, UE 115-e may receive an indication of the plurality of portions of the respective durations. Additionally or alternatively, the plurality of portions of the respective durations may be preconfigured within UE 115-e.

At 720, UE 115-e may receive, from base station 105-b via a broadcast message in the first portion of a first duration of the plurality of respective durations, the first encoded transmission for a respective data block of the plurality of data blocks, where the first encoded transmission is based on a rateless code. In some cases, the rateless code may include a fountain code, a Luby transform code, a Raptor code, or a combination thereof.

At 725, UE 115-e may perform a decoding process on the first encoded transmission.

At 730, UE 115-e may transmit, to base station 105-b, assistance information during the second portion of the first duration indicated in the configuration information for reporting assistance information for the first encoded transmission based on performing the decoding process. In some cases, the assistance information may include an indication of whether a decoding process of the first encoded transmission at UE 115-e is complete or incomplete, missing packet information, CSI to be used for a unicast or a multicast transmission of the one or more encoded transmissions, or a combination thereof.

At 735, base station 105-b may determine that UE 115-e failed to decode at least a portion of the first encoded transmission based on the assistance information. In some cases, base station 105-b may also determine that a second UE 115 failed to decode at least a portion of the first encoded transmission based on respective assistance information.

At 740, UE 115-e may receive, from base station 105-b via a unicast message or a multicast message in the third portion of the first duration, the additional encoded transmission based on the assistance information including an indication that at least a portion of the first encoded transmission was not successfully decoded. In some cases, the additional encoded transmission may include one of a plurality of MU-MIMO transmissions transmitted by base station 105-b in the third portion of the first duration to UE 115-e and other UEs 115.

In some cases, the first encoded transmission may include a plurality of encoded packets, the assistance information may include an indication of one or more packets not successfully decoded in the decoding process, and the additional encoded transmission may include a retransmission of the one or more packets. Additionally or alternatively, the additional encoded transmission may include one or more additional encoded packets based on the rateless code.

For example, at 740, base station 105-b may transmit, to UE 115-e, a first additional encoded transmission based on the determination that UE 115-e failed to decode at least a portion of the first encoded transmission. Additionally, in some cases, base station 105-b may transmit, to the second UE 115, a second additional encoded transmission based on a determination that the second UE 115 failed to decode at least a portion of the first encoded transmission. In some cases, the first additional encoded transmission and the second additional encoded transmission may be a MU-MIMO transmission (e.g., unicast transmissions). Additionally or alternatively, base station 105-b may transmit the first additional encoded transmission in a multicast message to UE 115-e and the second UE 115.

Figure 8:
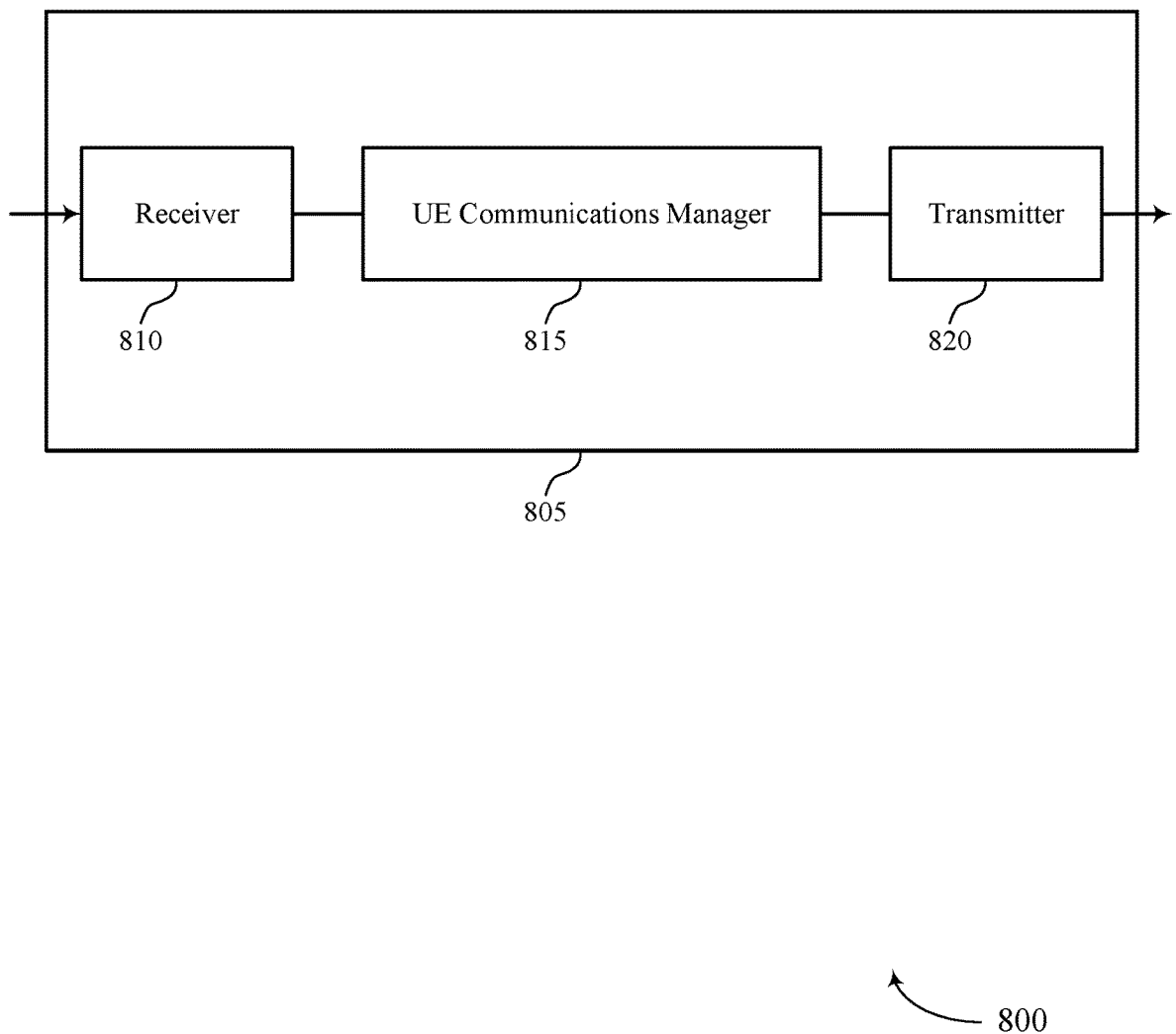
FIGS. 8 and 9 show block diagrams of devices that support joint broadcast and unicast design for MIMO systems in accordance with aspects of the present disclosure.

FIG. 8 shows a block diagram 800 of a device 805 that supports joint broadcast and unicast design for MIMO systems in accordance with aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to joint broadcast and unicast design for MIMO systems, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive, from a base station, configuration information for communication of a set of data blocks in a set of respective durations. Subsequently, the UE communications manager 815 may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. In some cases, the UE communications manager 815 may receive, from the base station via a broadcast message in the first portion of a first duration of the set of respective durations, the first encoded transmission for a respective data block of the set of data blocks, where the first encoded transmission is based on a rateless code. Subsequently, the UE communications manager 815 may perform a decoding process on the first encoded transmission. Additionally, the UE communications manager 815 may transmit, to the base station, assistance information during the second portion of the first duration indicated in the configuration information for reporting assistance information for the first encoded transmission based on performing the decoding process. The UE communications manager 815 may be an example of aspects of the UE communications manager 1110 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
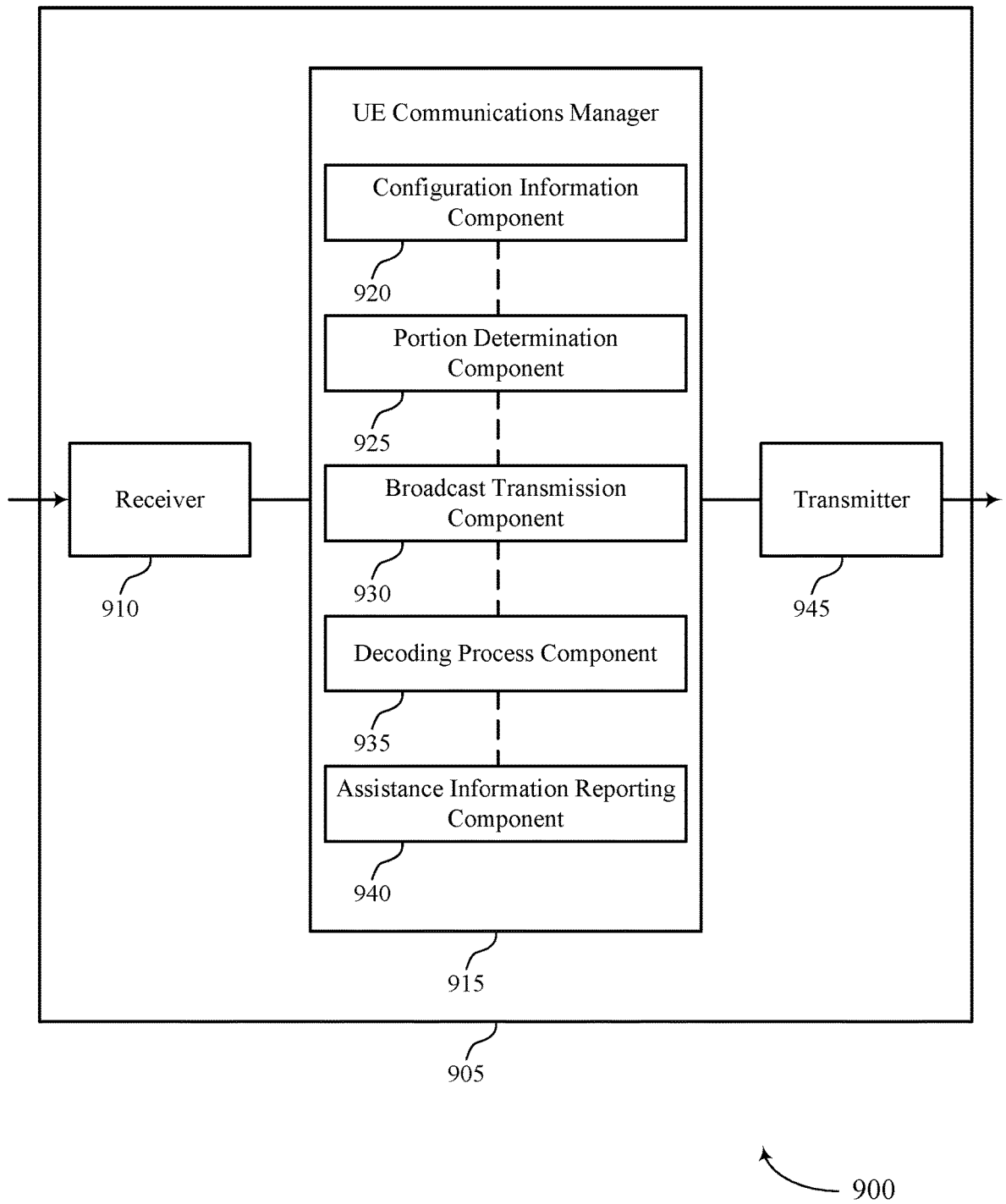

FIG. 9 shows a block diagram 900 of a device 905 that supports joint broadcast and unicast design for MIMO systems in accordance with aspects of the present disclosure. The device 905 may be an example of aspects of a device 805, or a UE 115 as described herein. The device 905 may include a receiver 910, a UE communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to joint broadcast and unicast design for MIMO systems, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include a configuration information component 920, a portion determination component 925, a broadcast transmission component 930, a decoding process component 935, and an assistance information reporting component 940. The UE communications manager 915 may be an example of aspects of the UE communications manager 1110 described herein.

The configuration information component 920 may receive, from a base station, configuration information for communication of a set of data blocks in a set of respective durations.

The portion determination component 925 may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof.

The broadcast transmission component 930 may receive, from the base station via a broadcast message in the first portion of a first duration of the set of respective durations, the first encoded transmission for a respective data block of the set of data blocks, where the first encoded transmission is based on a rateless code.

The decoding process component 935 may perform a decoding process on the first encoded transmission.

The assistance information reporting component 940 may transmit, to the base station, assistance information during the second portion of the first duration indicated in the configuration information for reporting assistance information for the first encoded transmission based on performing the decoding process.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
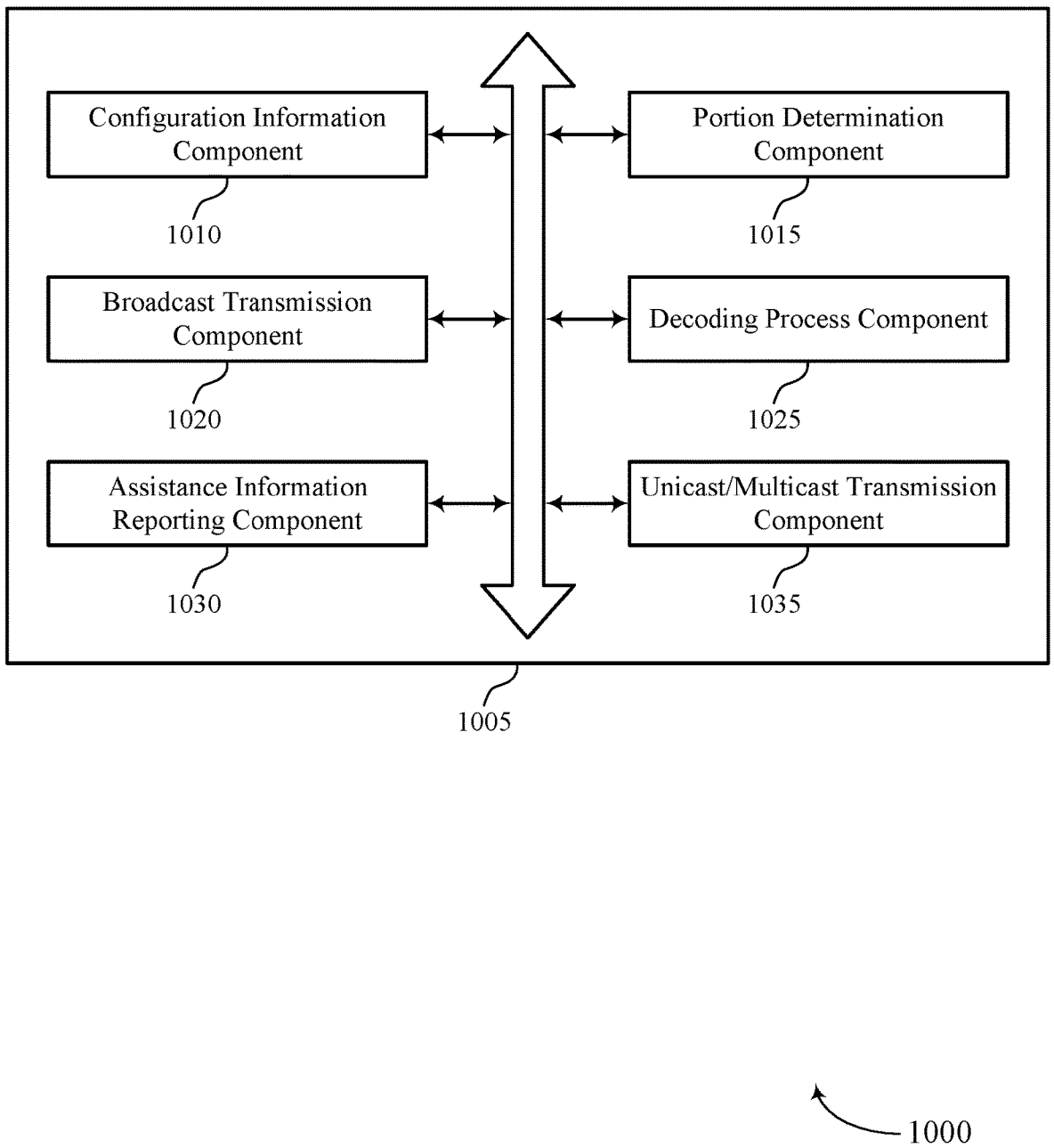
FIG. 10 shows a block diagram of a user equipment (UE) communications manager that supports joint broadcast and unicast design for MIMO systems in accordance with aspects of the present disclosure.

FIG. 10 shows a block diagram 1000 of a UE communications manager 1005 that supports joint broadcast and unicast design for MIMO systems in accordance with aspects of the present disclosure. The UE communications manager 1005 may be an example of aspects of a UE communications manager 815, a UE communications manager 915, or a UE communications manager 1110 described herein. The UE communications manager 1005 may include a configuration information component 1010, a portion determination component 1015, a broadcast transmission component 1020, a decoding process component 1025, an assistance information reporting component 1030, and an unicast/multicast transmission component 1035. Each of these modules may communicate, directly or indirectly, with one another (e.g., via one or more buses).

The configuration information component 1010 may receive, from a base station, configuration information for communication of a set of data blocks in a set of respective durations.

The portion determination component 1015 may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. In some examples, the portion determination component 1015 may receive an indication of the set of portions of the respective durations. Additionally or alternatively, the set of portions of the respective durations may be preconfigured within the UE.

The broadcast transmission component 1020 may receive, from the base station via a broadcast message in the first portion of a first duration of the set of respective durations, the first encoded transmission for a respective data block of the set of data blocks, where the first encoded transmission is based on a rateless code. In some cases, the rateless code may include a fountain code, a Luby transform code, a Raptor code, or a combination thereof.

The decoding process component 1025 may perform a decoding process on the first encoded transmission.

The assistance information reporting component 1030 may transmit, to the base station, assistance information during the second portion of the first duration indicated in the configuration information for reporting assistance information for the first encoded transmission based on performing the decoding process. In some cases, the assistance information may include CSI for the additional encoded transmission.

The unicast/multicast transmission component 1035 may receive, from the base station via a unicast message or a multicast message in the third portion of the first duration, the additional encoded transmission based on the assistance information including an indication that at least a portion of the first encoded transmission was not successfully decoded. In some cases, the additional encoded transmission may include one of a set of MU-MIMO transmissions transmitted by the base station in the third portion of the first duration to the UE and other UEs.

Additionally, in some cases, the first encoded transmission may include a set of encoded packets, the assistance information may include an indication of one or more packets not successfully decoded in the decoding process, and the additional encoded transmission may include a retransmission of the one or more packets. Additionally or alternatively, the additional encoded transmission may include one or more additional encoded packets based on the rateless code.

Figure 11:
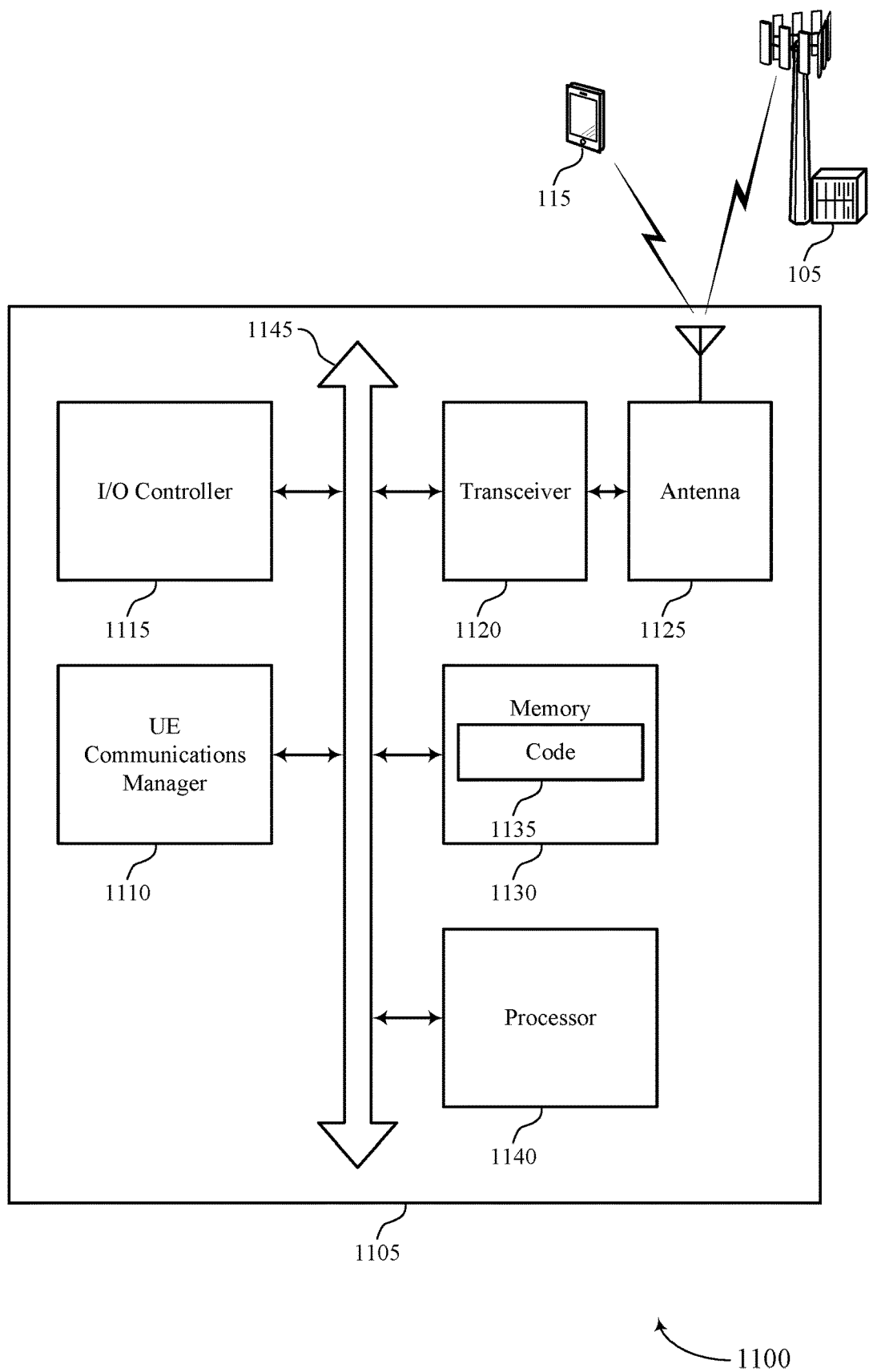
FIG. 11 shows a diagram of a system including a device that supports joint broadcast and unicast design for MIMO systems in accordance with aspects of the present disclosure.

FIG. 11 shows a diagram of a system 1100 including a device 1105 that supports joint broadcast and unicast design for MIMO systems in accordance with aspects of the present disclosure. The device 1105 may be an example of or include the components of device 805, device 905, or a UE 115 as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive, from a base station, configuration information for communication of a set of data blocks in a set of respective durations. Subsequently, The UE communications manager 1110 may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. In some cases, the UE communications manager 1110 may receive, from the base station via a broadcast message in the first portion of a first duration of the set of respective durations, the first encoded transmission for a respective data block of the set of data blocks, where the first encoded transmission is based on a rateless code. Additionally, the UE communications manager 1110 may perform a decoding process on the first encoded transmission. Subsequently, the UE communications manager 1110 may transmit, to the base station, assistance information during the second portion of the first duration indicated in the configuration information for reporting assistance information for the first encoded transmission based on performing the decoding process.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting joint broadcast and unicast design for MIMO systems).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
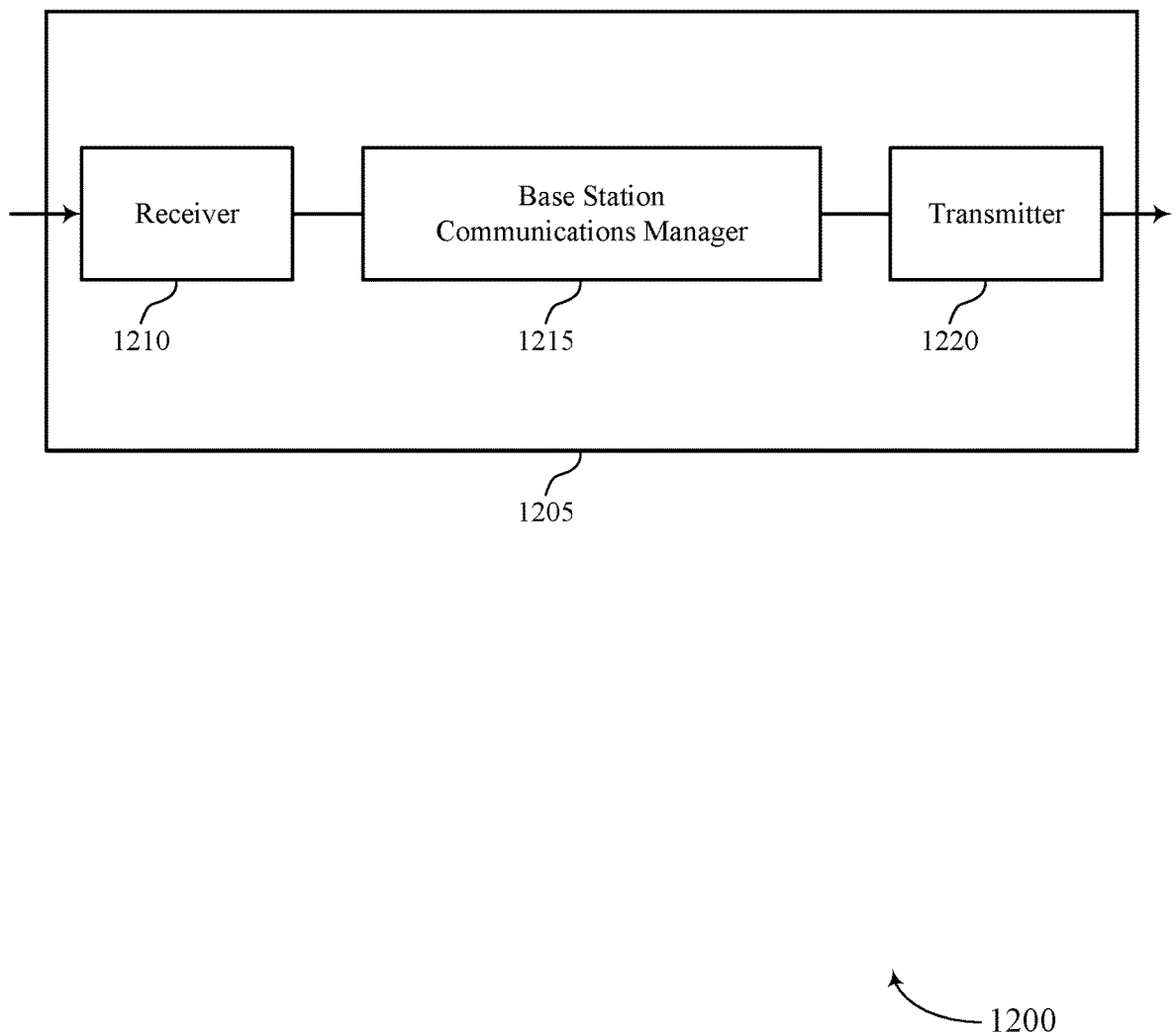
FIGS. 12 and 13 show block diagrams of devices that support joint broadcast and unicast design for MIMO systems in accordance with aspects of the present disclosure.

FIG. 12 shows a block diagram 1200 of a device 1205 that supports joint broadcast and unicast design for MIMO systems in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to joint broadcast and unicast design for MIMO systems, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. Subsequently, the base station communications manager 1215 may transmit, to a first UE and a second UE, the configuration information for communication of the set of data blocks. Additionally, the base station communications manager 1215 may transmit, in the first portion of a first duration via a broadcast message associated with a first data block, the first encoded transmission for the first data block, the first encoded transmission being encoded based on a rateless code. In some cases, the base station communications manager 1215 may receive, from the first UE and the second UE during the second portion of the first duration indicated in the configuration information for reporting assistance information for the first encoded transmission, respective assistance information based on the first and second UEs attempting decoding processes for the first encoded transmission. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
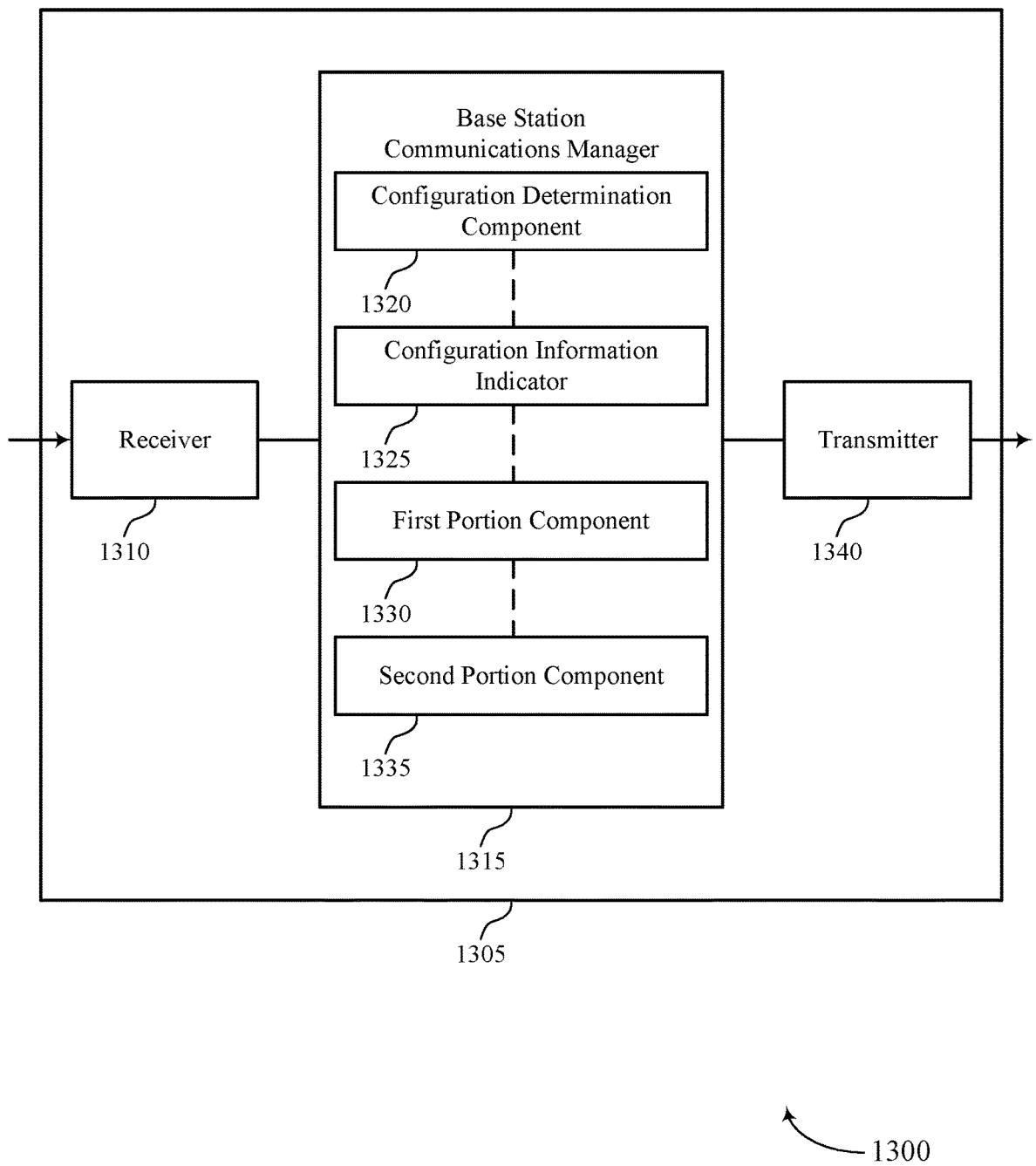

FIG. 13 shows a block diagram 1300 of a device 1305 that supports joint broadcast and unicast design for MIMO systems in accordance with aspects of the present disclosure. The device 1305 may be an example of aspects of a device 1205, or a base station 105 as described herein. The device 1305 may include a receiver 1310, a base station communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to joint broadcast and unicast design for MIMO systems, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a configuration determination component 1320, a configuration information indicator 1325, a first portion component 1330, and a second portion component 1335. The base station communications manager 1315 may be an example of aspects of the base station communications manager 1510 described herein.

The configuration determination component 1320 may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof.

The configuration information indicator 1325 may transmit, to a first UE and a second UE, the configuration information for communication of the set of data blocks.

The first portion component 1330 may transmit, in the first portion of a first duration via a broadcast message associated with a first data block, the first encoded transmission for the first data block, the first encoded transmission being encoded based on a rateless code.

The second portion component 1335 may receive, from the first UE and the second UE during the second portion of the first duration indicated in the configuration information for reporting assistance information for the first encoded transmission, respective assistance information based on the first and second UEs attempting decoding processes for the first encoded transmission.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
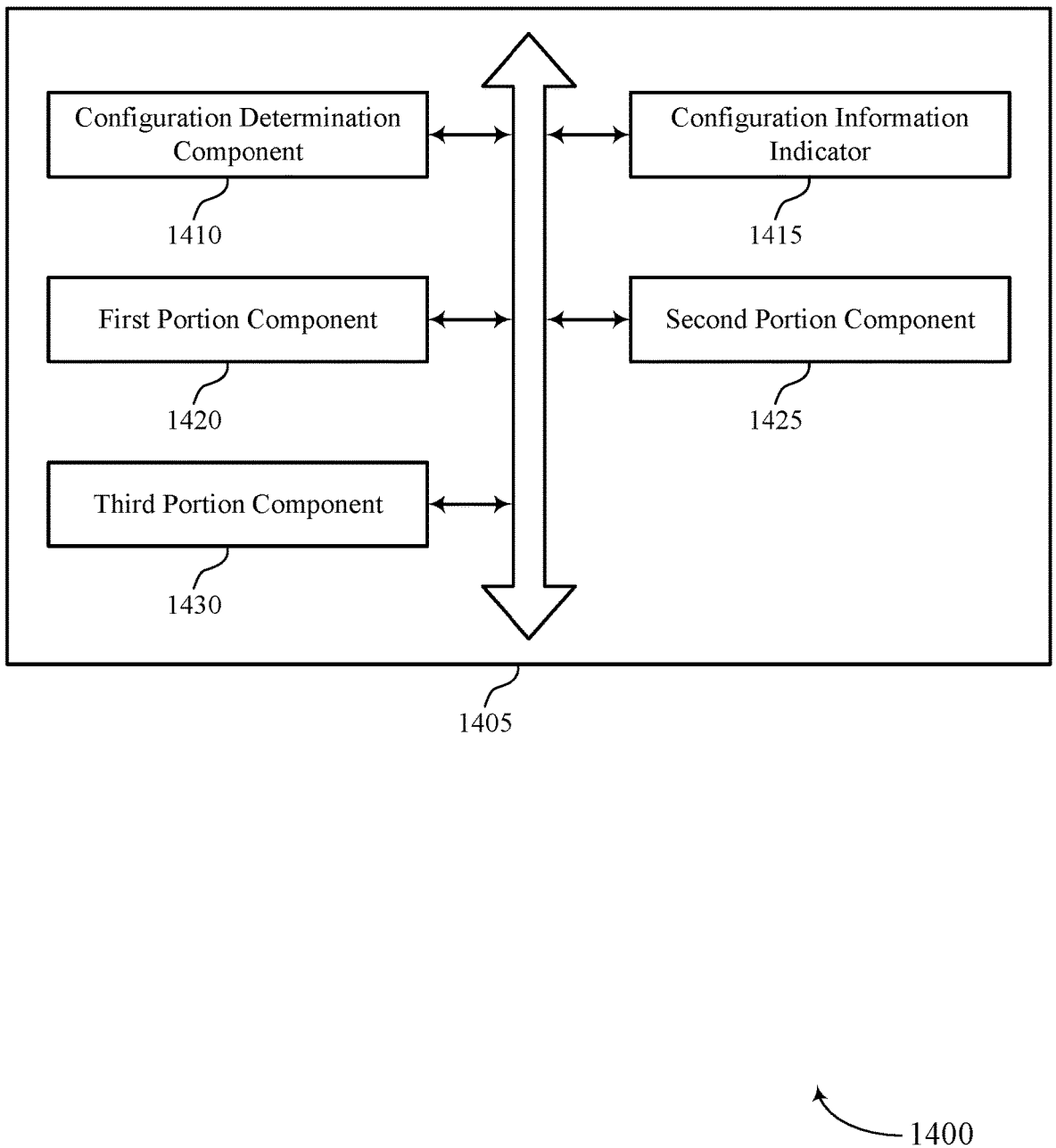
FIG. 14 shows a block diagram of a base station communications manager that supports joint broadcast and unicast design for MIMO systems in accordance with aspects of the present disclosure.

FIG. 14 shows a block diagram 1400 of a base station communications manager 1405 that supports joint broadcast and unicast design for MIMO systems in accordance with aspects of the present disclosure. The base station communications manager 1405 may be an example of aspects of a base station communications manager 1215, a base station communications manager 1315, or a base station communications manager 1510 described herein. The base station communications manager 1405 may include a configuration determination component 1410, a configuration information indicator 1415, a first portion component 1420, a second portion component 1425, and a third portion component 1430. Each of these modules may communicate, directly or indirectly, with one another (e.g., via one or more buses).

The configuration determination component 1410 may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. In some examples, the configuration determination component 1410 may determine the set of portions based on one or more UE metrics for a set of UEs including the first UE and the second UE, the one or more UE metrics including an SNR for the set of UEs, a location of the set of UEs, CSI from the set of UEs, or a combination thereof.

The configuration information indicator 1415 may transmit, to a first UE and a second UE, the configuration information for communication of the set of data blocks. In some examples, the configuration information indicator 1415 may transmit an indication of at least one of the set of portions.

The first portion component 1420 may transmit, in the first portion of a first duration via a broadcast message associated with a first data block, the first encoded transmission for the first data block, the first encoded transmission being encoded based on a rateless code. In some cases, the rateless code may include a fountain code, a Luby transform code, a Raptor code, or a combination thereof.

The second portion component 1425 may receive, from the first UE and the second UE during the second portion of the first duration indicated in the configuration information for reporting assistance information for the first encoded transmission, respective assistance information based on the first and second UEs attempting decoding processes for the first encoded transmission. In some cases, the assistance information may include an indication of whether a decoding process of the first encoded transmission at the first UE or the second UE is complete or incomplete, missing packet information, CSI to be used for a unicast or a multicast transmission of the one or more encoded transmissions, or a combination thereof.

The third portion component 1430 may determine that the first UE failed to decode at least a portion of the first encoded transmission based on the respective assistance information. In some examples, the third portion component 1430 may transmit, to the first UE, a first additional encoded transmission based on the determination. Additionally, the third portion component 1430 may determine that the second UE failed to decode at least a portion of the first encoded transmission based on the respective assistance information. In some cases, the third portion component 1430 may transmit, to the second UE, a second additional encoded transmission based on the determination. In some cases, the first additional encoded transmission and the second additional encoded transmission may include a MU-MIMO transmission. Additionally or alternatively, the third portion component 1430 may transmit the first additional encoded transmission in a multicast message to the first UE and the second UE.

In some cases, the first encoded transmission may include a set of encoded packets, the assistance information may include an indication of one or more packets not successfully decoded by the first UE or the second UE, and the additional encoded transmission may include a retransmission of the one or more packets. Additionally or alternatively, the assistance information may include an indication that a decoding process at the first UE or the second UE was unsuccessful, and the additional encoded transmission may include one or more additional encoded packets based on the rateless code.

Figure 15:
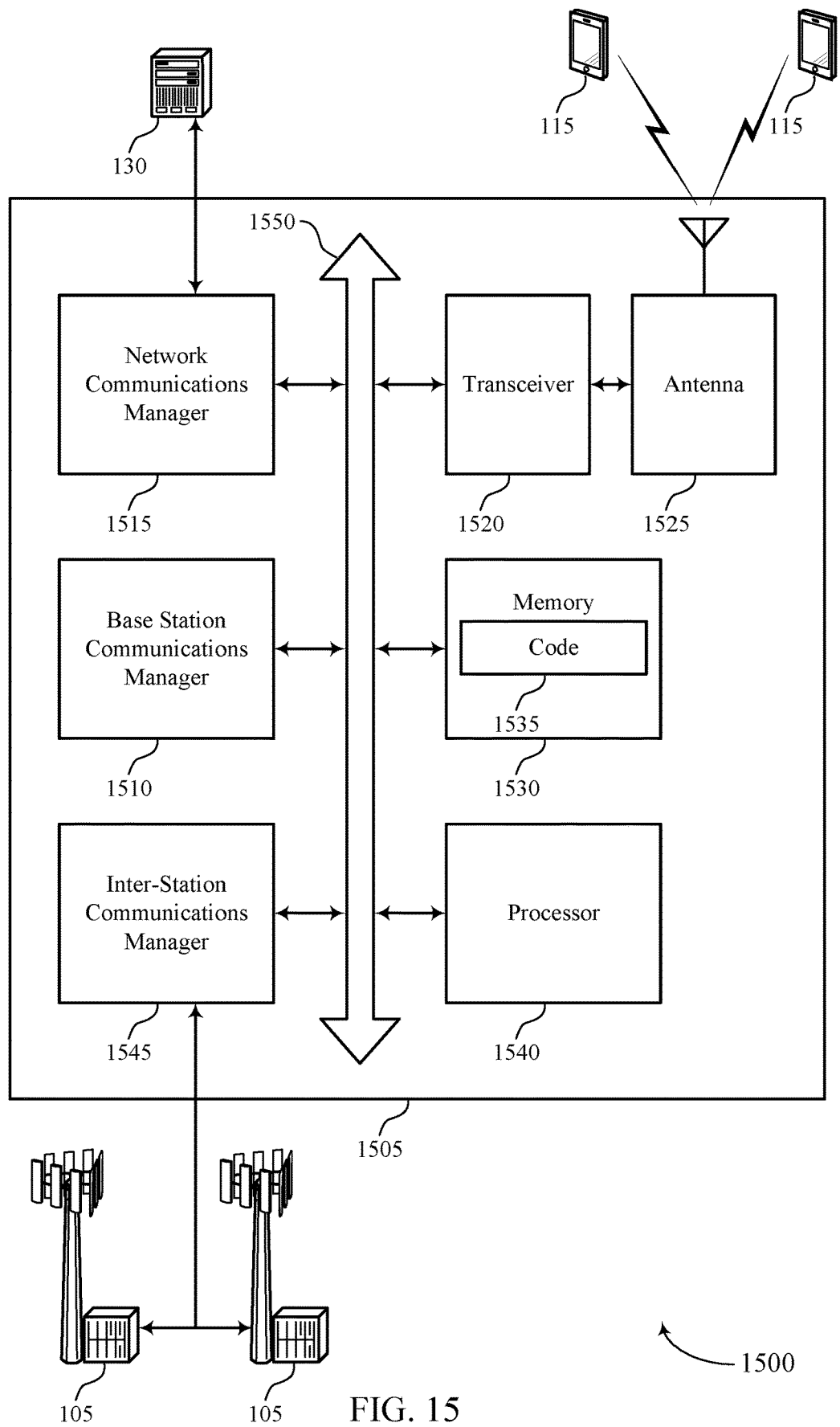
FIG. 15 shows a diagram of a system including a device that supports joint broadcast and unicast design for MIMO systems in accordance with aspects of the present disclosure.

FIG. 15 shows a diagram of a system 1500 including a device 1505 that supports joint broadcast and unicast design for MIMO systems in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. Subsequently, the base station communications manager 1510 may transmit, to a first UE and a second UE, the configuration information for communication of the set of data blocks. Additionally, the base station communications manager 1510 may transmit, in the first portion of a first duration via a broadcast message associated with a first data block, the first encoded transmission for the first data block, the first encoded transmission being encoded based on a rateless code. In some cases, the base station communications manager 1510 may receive, from the first UE and the second UE during the second portion of the first duration indicated in the configuration information for reporting assistance information for the first encoded transmission, respective assistance information based on the first and second UEs attempting decoding processes for the first encoded transmission.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting joint broadcast and unicast design for MIMO systems).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
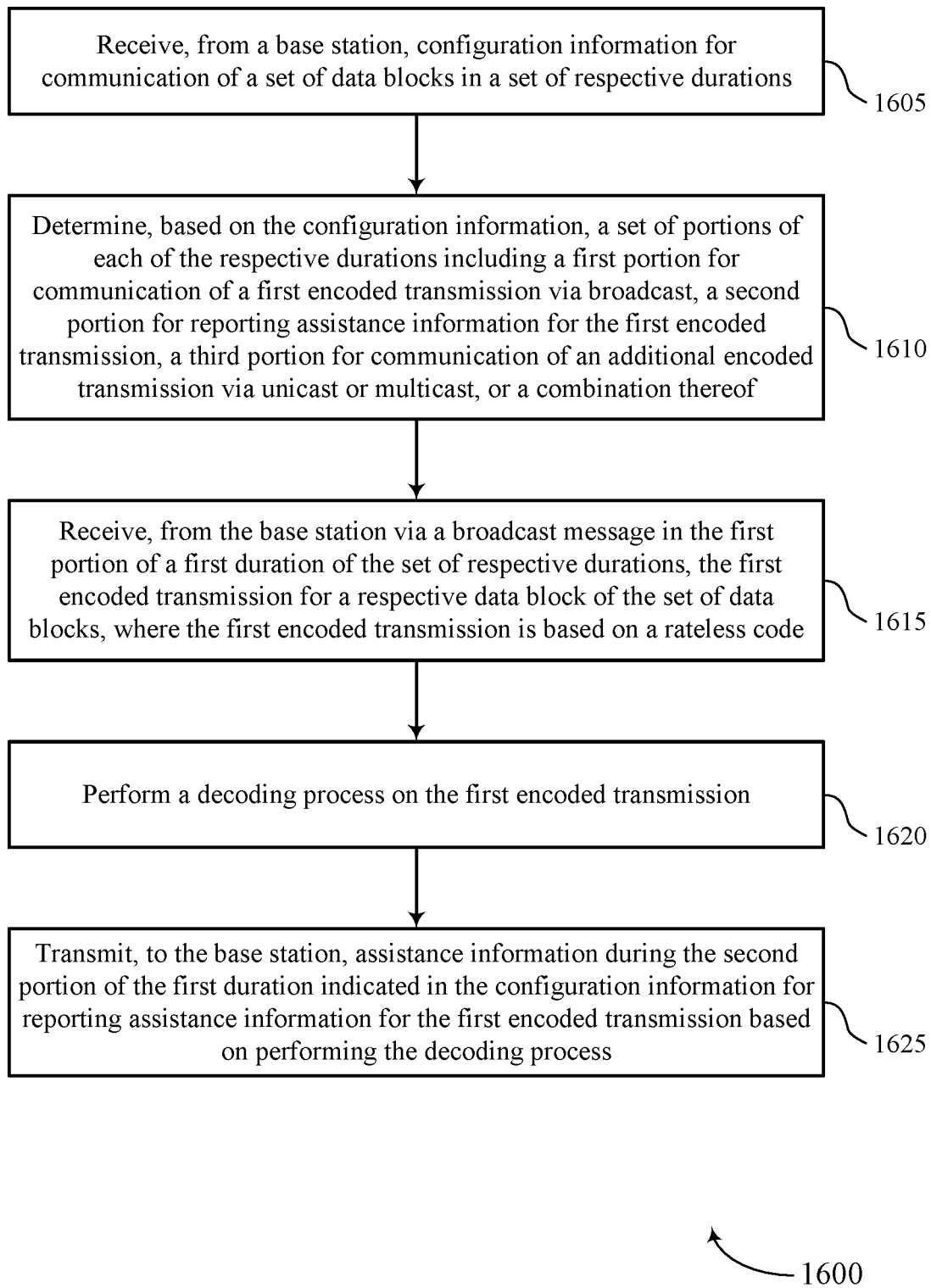
FIGS. 16 through 20 show flowcharts illustrating methods that support joint broadcast and unicast design for MIMO systems in accordance with aspects of the present disclosure.

FIG. 16 shows a flowchart illustrating a method 1600 that supports joint broadcast and unicast design for MIMO systems in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, configuration information for communication of a set of data blocks in a set of respective durations. The operations of 1605 may be performed according to the methods described herein. In some examples, aspects of the operations of 1605 may be performed by a configuration information component as described with reference to FIGS. 8 through 11.

At 1610, the UE may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. The operations of 1610 may be performed according to the methods described herein. In some examples, aspects of the operations of 1610 may be performed by a portion determination component as described with reference to FIGS. 8 through 11.

At 1615, the UE may receive, from the base station via a broadcast message in the first portion of a first duration of the set of respective durations, the first encoded transmission for a respective data block of the set of data blocks, where the first encoded transmission is based on a rateless code. The operations of 1615 may be performed according to the methods described herein. In some examples, aspects of the operations of 1615 may be performed by a broadcast transmission component as described with reference to FIGS. 8 through 11.

At 1620, the UE may perform a decoding process on the first encoded transmission. The operations of 1620 may be performed according to the methods described herein. In some examples, aspects of the operations of 1620 may be performed by a decoding process component as described with reference to FIGS. 8 through 11.

At 1625, the UE may transmit, to the base station, assistance information during the second portion of the first duration indicated in the configuration information for reporting assistance information for the first encoded transmission based on performing the decoding process. The operations of 1625 may be performed according to the methods described herein. In some examples, aspects of the operations of 1625 may be performed by an assistance information reporting component as described with reference to FIGS. 8 through 11.

Figure 17:
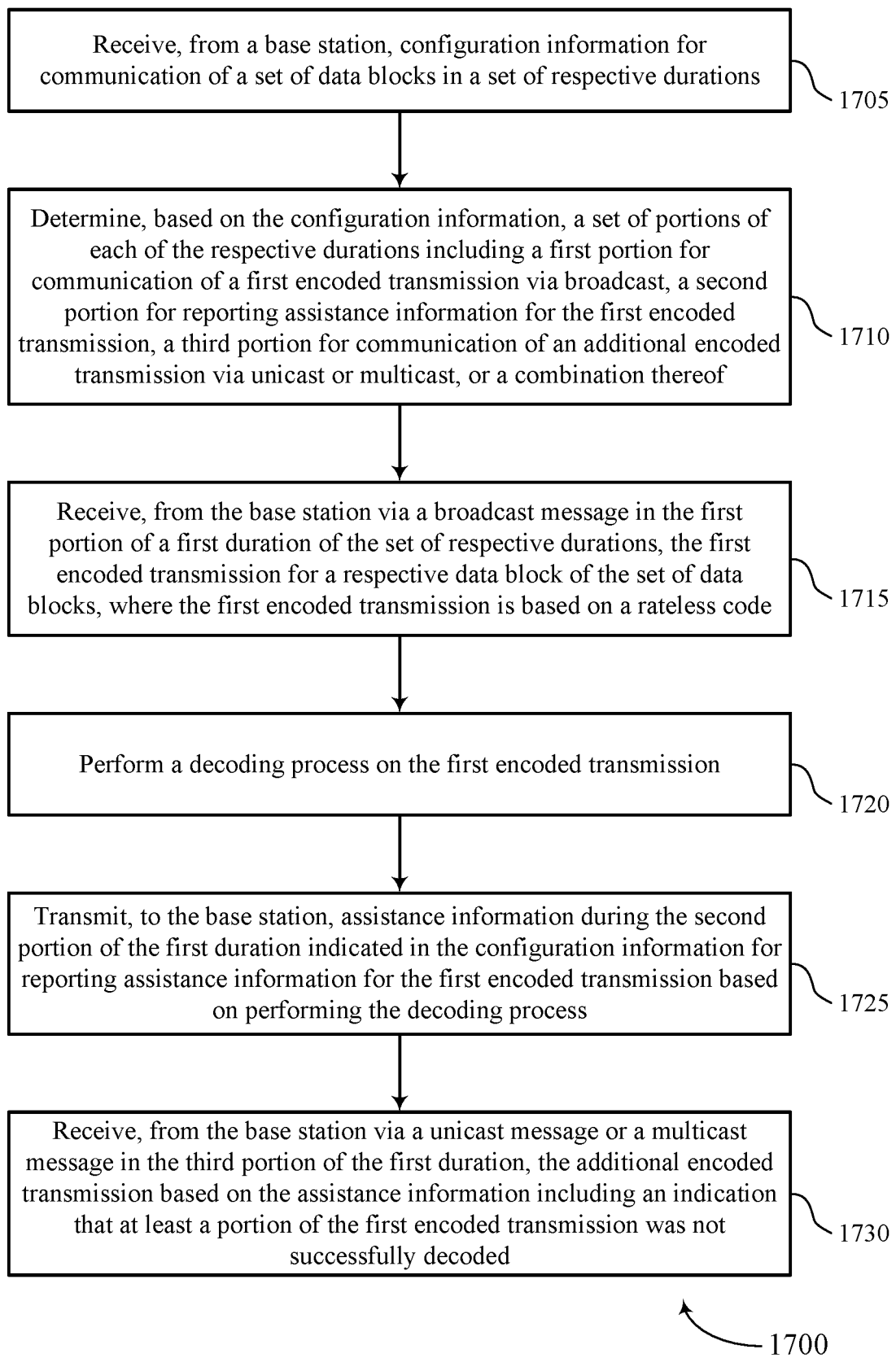

FIG. 17 shows a flowchart illustrating a method 1700 that supports joint broadcast and unicast design for MIMO systems in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, configuration information for communication of a set of data blocks in a set of respective durations. The operations of 1705 may be performed according to the methods described herein. In some examples, aspects of the operations of 1705 may be performed by a configuration information component as described with reference to FIGS. 8 through 11.

At 1710, the UE may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. The operations of 1710 may be performed according to the methods described herein. In some examples, aspects of the operations of 1710 may be performed by a portion determination component as described with reference to FIGS. 8 through 11.

At 1715, the UE may receive, from the base station via a broadcast message in the first portion of a first duration of the set of respective durations, the first encoded transmission for a respective data block of the set of data blocks, where the first encoded transmission is based on a rateless code. The operations of 1715 may be performed according to the methods described herein. In some examples, aspects of the operations of 1715 may be performed by a broadcast transmission component as described with reference to FIGS. 8 through 11.

At 1720, the UE may perform a decoding process on the first encoded transmission. The operations of 1720 may be performed according to the methods described herein. In some examples, aspects of the operations of 1720 may be performed by a decoding process component as described with reference to FIGS. 8 through 11.

At 1725, the UE may transmit, to the base station, assistance information during the second portion of the first duration indicated in the configuration information for reporting assistance information for the first encoded transmission based on performing the decoding process. The operations of 1725 may be performed according to the methods described herein. In some examples, aspects of the operations of 1725 may be performed by an assistance information reporting component as described with reference to FIGS. 8 through 11.

At 1730, the UE may receive, from the base station via a unicast message or a multicast message in the third portion of the first duration, the additional encoded transmission based on the assistance information including an indication that at least a portion of the first encoded transmission was not successfully decoded. The operations of 1730 may be performed according to the methods described herein. In some examples, aspects of the operations of 1730 may be performed by a unicast/multicast transmission component as described with reference to FIGS. 8 through 11.

Figure 18:
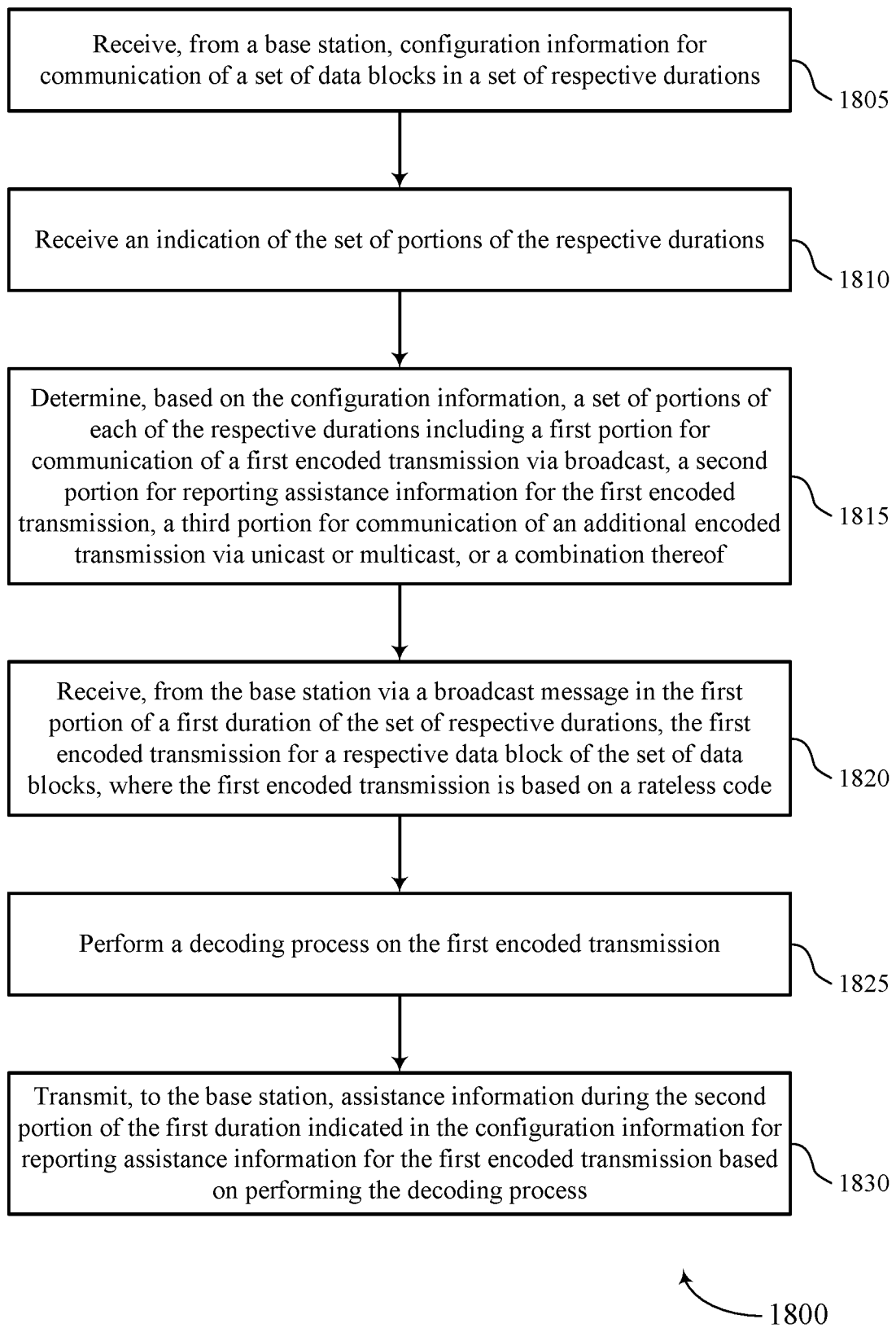

FIG. 18 shows a flowchart illustrating a method 1800 that supports joint broadcast and unicast design for MIMO systems in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, configuration information for communication of a set of data blocks in a set of respective durations. The operations of 1805 may be performed according to the methods described herein. In some examples, aspects of the operations of 1805 may be performed by a configuration information component as described with reference to FIGS. 8 through 11.

At 1810, the UE may receive an indication of the set of portions of the respective durations. The operations of 1810 may be performed according to the methods described herein. In some examples, aspects of the operations of 1810 may be performed by a portion determination component as described with reference to FIGS. 8 through 11.

At 1815, the UE may determine, based on the configuration information, a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. The operations of 1815 may be performed according to the methods described herein. In some examples, aspects of the operations of 1815 may be performed by a portion determination component as described with reference to FIGS. 8 through 11.

At 1820, the UE may receive, from the base station via a broadcast message in the first portion of a first duration of the set of respective durations, the first encoded transmission for a respective data block of the set of data blocks, where the first encoded transmission is based on a rateless code. The operations of 1820 may be performed according to the methods described herein. In some examples, aspects of the operations of 1820 may be performed by a broadcast transmission component as described with reference to FIGS. 8 through 11.

At 1825, the UE may perform a decoding process on the first encoded transmission. The operations of 1825 may be performed according to the methods described herein. In some examples, aspects of the operations of 1825 may be performed by a decoding process component as described with reference to FIGS. 8 through 11.

At 1830, the UE may transmit, to the base station, assistance information during the second portion of the first duration indicated in the configuration information for reporting assistance information for the first encoded transmission based on performing the decoding process. The operations of 1830 may be performed according to the methods described herein. In some examples, aspects of the operations of 1830 may be performed by an assistance information reporting component as described with reference to FIGS. 8 through 11.

Figure 19:
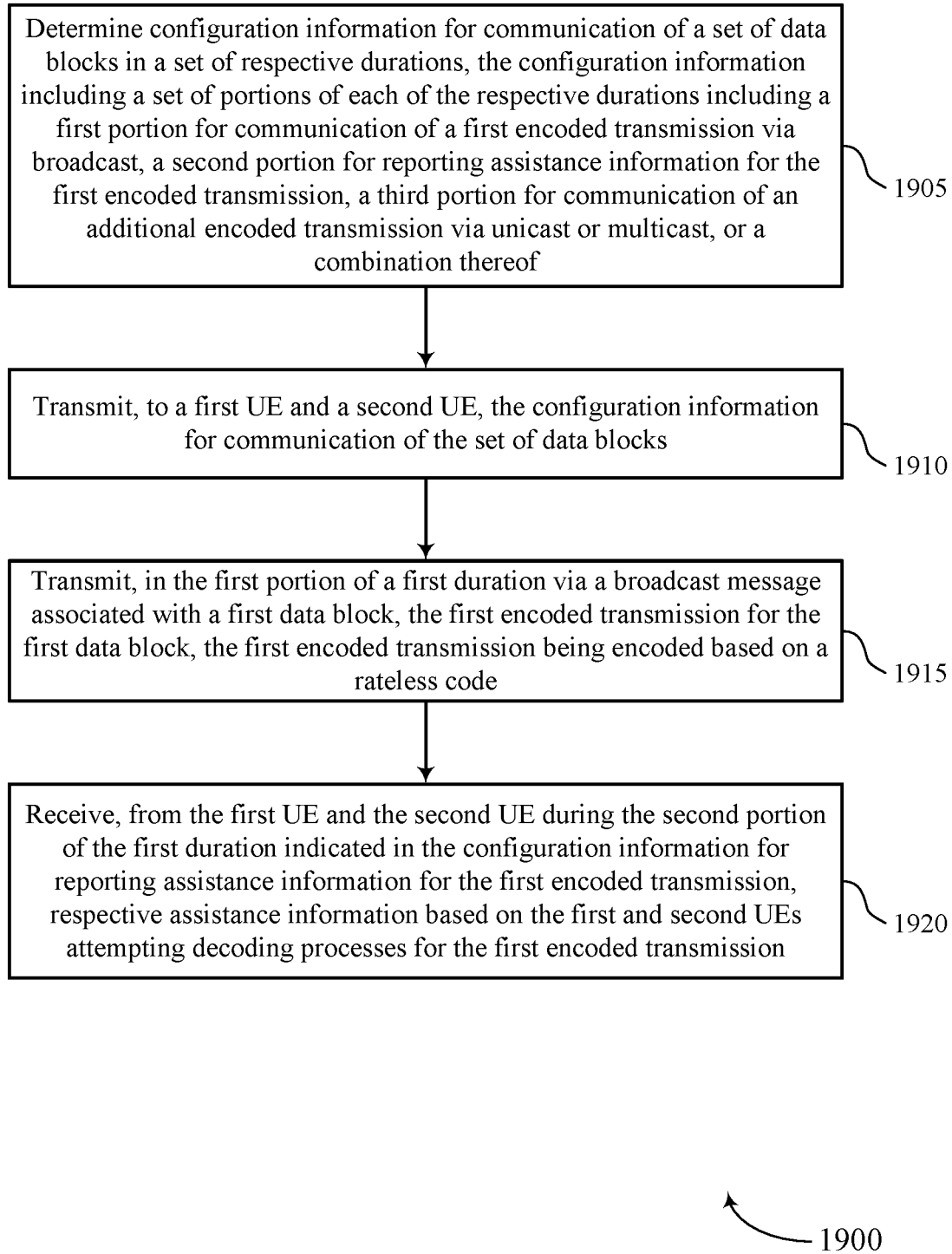

FIG. 19 shows a flowchart illustrating a method 1900 that supports joint broadcast and unicast design for MIMO systems in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. The operations of 1905 may be performed according to the methods described herein. In some examples, aspects of the operations of 1905 may be performed by a configuration determination component as described with reference to FIGS. 12 through 15.

At 1910, the base station may transmit, to a first UE and a second UE, the configuration information for communication of the set of data blocks. The operations of 1910 may be performed according to the methods described herein. In some examples, aspects of the operations of 1910 may be performed by a configuration information indicator as described with reference to FIGS. 12 through 15.

At 1915, the base station may transmit, in the first portion of a first duration via a broadcast message associated with a first data block, the first encoded transmission for the first data block, the first encoded transmission being encoded based on a rateless code. The operations of 1915 may be performed according to the methods described herein. In some examples, aspects of the operations of 1915 may be performed by a first portion component as described with reference to FIGS. 12 through 15.

At 1920, the base station may receive, from the first UE and the second UE during the second portion of the first duration indicated in the configuration information for reporting assistance information for the first encoded transmission, respective assistance information based on the first and second UEs attempting decoding processes for the first encoded transmission. The operations of 1920 may be performed according to the methods described herein. In some examples, aspects of the operations of 1920 may be performed by a second portion component as described with reference to FIGS. 12 through 15.

Figure 20:
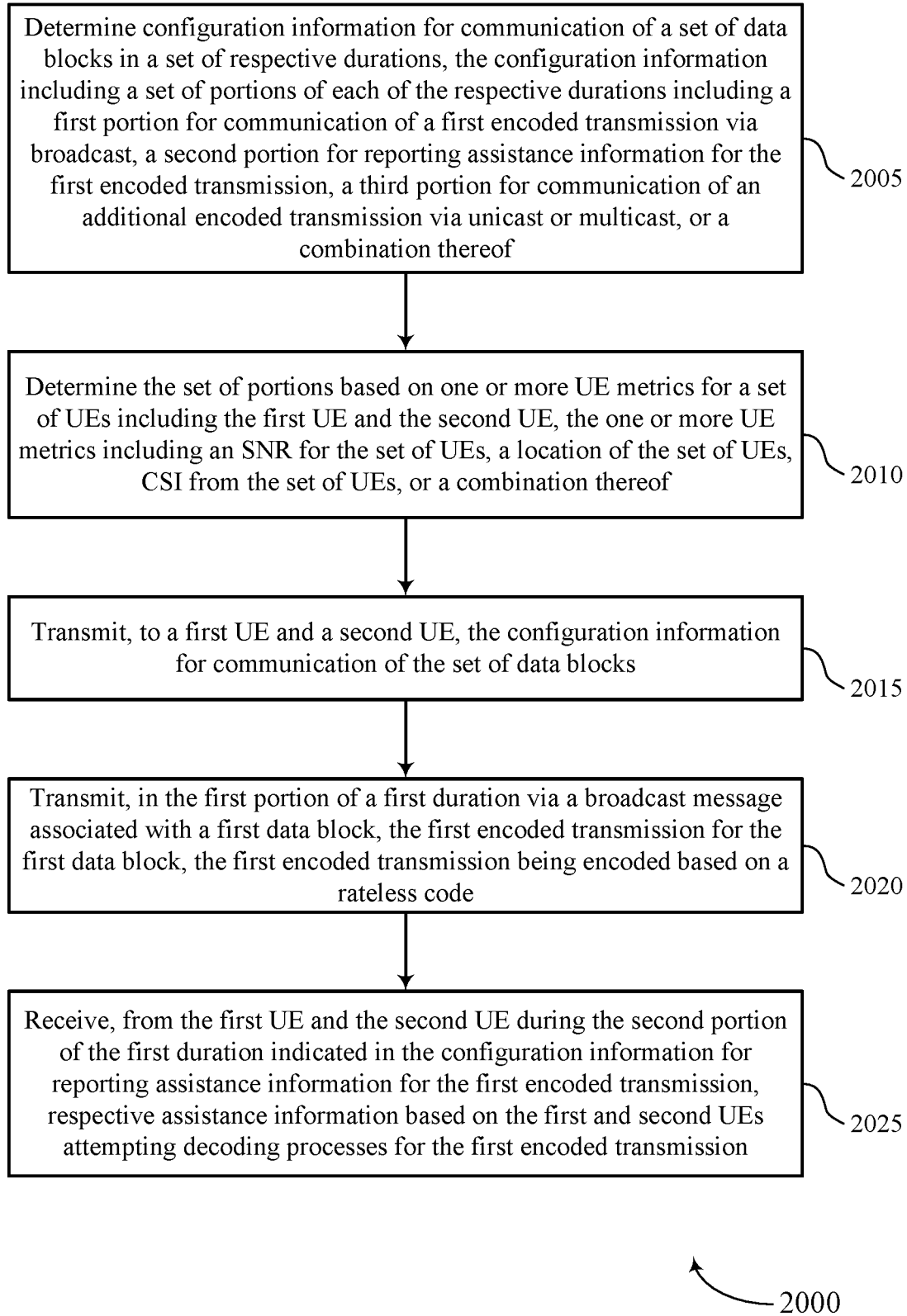

FIG. 20 shows a flowchart illustrating a method 2000 that supports joint broadcast and unicast design for MIMO systems in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may determine configuration information for communication of a set of data blocks in a set of respective durations, the configuration information including a set of portions of each of the respective durations including a first portion for communication of a first encoded transmission via broadcast, a second portion for reporting assistance information for the first encoded transmission, a third portion for communication of an additional encoded transmission via unicast or multicast, or a combination thereof. The operations of 2005 may be performed according to the methods described herein. In some examples, aspects of the operations of 2005 may be performed by a configuration determination component as described with reference to FIGS. 12 through 15.

At 2010, the base station may determine the set of portions based on one or more UE metrics for a set of UEs including the first UE and the second UE, the one or more UE metrics including a signal-to-noise ratio for the set of UEs, a location of the set of UEs, channel state information from the set of UEs, or a combination thereof. The operations of 2010 may be performed according to the methods described herein. In some examples, aspects of the operations of 2010 may be performed by a configuration determination component as described with reference to FIGS. 12 through 15.

At 2015, the base station may transmit, to a first UE and a second UE, the configuration information for communication of the set of data blocks. The operations of 2015 may be performed according to the methods described herein. In some examples, aspects of the operations of 2015 may be performed by a configuration information indicator as described with reference to FIGS. 12 through 15.

At 2020, the base station may transmit, in the first portion of a first duration via a broadcast message associated with a first data block, the first encoded transmission for the first data block, the first encoded transmission being encoded based on a rateless code. The operations of 2020 may be performed according to the methods described herein. In some examples, aspects of the operations of 2020 may be performed by a first portion component as described with reference to FIGS. 12 through 15.

At 2025, the base station may receive, from the first UE and the second UE during the second portion of the first duration indicated in the configuration information for reporting assistance information for the first encoded transmission, respective assistance information based on the first and second UEs attempting decoding processes for the first encoded transmission. The operations of 2025 may be performed according to the methods described herein. In some examples, aspects of the operations of 2025 may be performed by a second portion component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of further examples of the present invention:

Example 1: A method for wireless communications at a user equipment (UE), comprising receiving, from a base station, configuration information for communication of a plurality of data blocks in a plurality of respective durations determining, based at least in part on the configuration information, a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof receiving, from the base station via a broadcast message in the first portion of a first duration of the plurality of respective durations, the first encoded transmission for a respective data block of the plurality of data blocks, wherein the first encoded transmission is based at least in part on a rateless code performing a decoding process on the first encoded transmission transmitting, to the base station, assistance information during the second portion of the first duration indicated in the configuration information for reporting assistance information for the first encoded transmission based at least in part on performing the decoding process.

Example 2: The method of example 1, further comprising receiving, from the base station via a unicast message or a multicast message in the third portion of the first duration, the additional encoded transmission based at least in part on the assistance information comprising an indication that at least a portion of the first encoded transmission was not successfully decoded.

Example 3: The method of example 2, wherein the additional encoded transmission comprises one of a plurality of multiple-user multiple-input multiple-output transmissions transmitted by the base station in the third portion of the first duration to the UE and other UEs.

Example 4: The method of any one of examples 2 through 3, wherein the first encoded transmission comprises a plurality of encoded packets, and wherein the assistance information comprises an indication of one or more packets not successfully decoded in the decoding process, and wherein the additional encoded transmission comprises a retransmission of the one or more packets.

Example 5: The method of any one of examples 2 through 3, wherein the first encoded transmission comprises a plurality of encoded packets, and wherein the assistance information comprises an indication that the decoding process was unsuccessful, and wherein the additional encoded transmission comprises one or more additional encoded packets based at least in part on the rateless code.

Example 6: The method of any one of examples 1 through 5, wherein receiving the configuration information comprises: receiving an indication of the plurality of portions of the respective durations.

Example 7: The method of example 6, wherein the plurality of portions of the respective durations are preconfigured within the UE.

Example 8: The method of any one of examples 1 through 7, wherein the assistance information comprises channel state information for the additional encoded transmission.

Example 9: The method of any one of examples 1 through 8, wherein the rateless code comprises a fountain code, a Luby transform code, a Raptor code, or a combination thereof.

Example 10: A method for wireless communications at a base station, comprising determining configuration information for communication of a plurality of data blocks in a plurality of respective durations, the configuration information comprising a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof transmitting, to a first user equipment (UE) and a second UE, the configuration information for communication of the plurality of data blocks transmitting, in the first portion of a first duration via a broadcast message associated with a first data block, the first encoded transmission for the first data block, the first encoded transmission being encoded based at least in part on a rateless code receiving, from the first UE and the second UE during the second portion of the first duration indicated in the configuration information for reporting assistance information for the first encoded transmission, respective assistance information based at least in part on the first and second UEs attempting decoding processes for the first encoded transmission.

Example 11: The method of example 10, further comprising determining that the first UE failed to decode at least a portion of the first encoded transmission based at least in part on the respective assistance information transmitting, to the first UE, a first additional encoded transmission based at least in part on the determination.

Example 12: The method of example 11, further comprising determining that the second UE failed to decode at least a portion of the first encoded transmission based at least in part on the respective assistance information transmitting, to the second UE, a second additional encoded transmission based at least in part on the determination.

Example 13: The method of example 12, wherein the first additional encoded transmission and the second additional encoded transmission comprise a multiple-user multiple-input multiple-output transmission.

Example 14: The method of example 11, further comprising determining that the second UE failed to decode at least a portion of the first encoded transmission based at least in part on the respective assistance information transmitting the first additional encoded transmission in a multicast message to the first UE and the second UE.

Example 15: The method of any one of examples 11 through 14, wherein the first encoded transmission comprises a plurality of encoded packets, and wherein the assistance information comprises an indication of one or more packets not successfully decoded by the first UE or the second UE, and wherein the additional encoded transmission comprises a retransmission of the one or more packets.

Example 16: The method of any one of examples 11 through 14, wherein the first encoded transmission comprises a plurality of encoded packets, and wherein the assistance information comprises an indication that a decoding process at the first UE or the second UE was unsuccessful, and wherein the additional encoded transmission comprises one or more additional encoded packets based at least in part on the rateless code.

Example 17: The method of any one of examples 10 through 16, wherein transmitting the configuration information comprises: transmitting an indication of at least one of the plurality of portions.

Example 18: The method of any one of examples 10 through 17, further comprising determining the plurality of portions based at least in part on one or more UE metrics for a set of UEs including the first UE and the second UE, the one or more UE metrics comprising a signal-to-noise ratio for the set of UEs, a location of the set of UEs, channel state information from the set of UEs, or a combination thereof.

Example 19: The method of any one of examples 10 through 18, wherein the assistance information comprises an indication of whether a decoding process of the first encoded transmission at the first UE or the second UE is complete or incomplete, missing packet information, channel state information to be used for a unicast or a multicast transmission of the one or more encoded transmissions, or a combination thereof.

Example 20: The method of any one of examples 10 through 19, wherein the rateless code comprises a fountain code, a Luby transform code, a Raptor code, or a combination thereof.

Example 21: An apparatus for wireless communications at a base station comprising at least one means for performing a method of any one of examples 1 through 9.

Example 22: An apparatus for wireless communications at a base station comprising a processor, memory in electronic communication with the processor, and instructions stored in the memory and executable by the processor to cause the apparatus to perform a method of any one of examples 1 through 9.

Example 23: A non-transitory computer-readable medium storing code for wireless communications at a base station comprising a processor, memory in electronic communication with the processor, and instructions stored in the memory and executable by the processor to cause the apparatus to perform a method of any one of examples 1 through 9.

Example 24: An apparatus for wireless communications at a base station comprising at least one means for performing a method of any one of examples 10 through 20.

Example 25: An apparatus for wireless communications at a base station comprising a processor, memory in electronic communication with the processor, and instructions stored in the memory and executable by the processor to cause the apparatus to perform a method of any one of examples 10 through 20.

Example 26: A non-transitory computer-readable medium storing code for wireless communications at a base station comprising a processor, memory in electronic communication with the processor, and instructions stored in the memory and executable by the processor to cause the apparatus to perform a method of any one of examples 10 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    a processor;
    memory coupled with the processor; and
    instructions stored in the memory and executable by the processor to cause the apparatus to:
    receive, from a network entity, configuration information for communication of a plurality of data blocks in a plurality of respective durations;
    determine, based at least in part on the configuration information, a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof;
    receive, from the network entity via a broadcast message in the first portion of a first duration of the plurality of respective durations, the first encoded transmission for a respective data block of the plurality of data blocks, wherein the first encoded transmission is based at least in part on a rateless code;
    perform a decoding process on the first encoded transmission; and
    transmit, to the network entity, assistance information during the second portion of the first duration indicated in the configuration information for reporting assistance information for the first encoded transmission based at least in part on performing the decoding process.

2. The apparatus of claim 1, wherein the instructions are further executable by the processor to cause the apparatus to:
    receive, from the network entity via a unicast message or a multicast message in the third portion of the first duration, the additional encoded transmission based at least in part on the assistance information comprising an indication that at least a portion of the first encoded transmission was not successfully decoded.

3. The apparatus of claim 2, wherein the first encoded transmission comprises a plurality of encoded packets, and wherein the assistance information comprises an indication of one or more packets of the plurality of encoded packets not successfully decoded in the decoding process, and wherein the additional encoded transmission comprises a retransmission of the one or more packets.

4. The apparatus of claim 3, wherein the first encoded transmission comprises a plurality of encoded packets, and wherein the assistance information comprises an indication that the decoding process was unsuccessful, and wherein the additional encoded transmission comprises one or more additional encoded packets based at least in part on the rateless code.

5. The apparatus of claim 1, wherein the assistance information comprises channel state information for the additional encoded transmission.

6. The apparatus of claim 1, wherein the instructions to receive the configuration information are executable by the processor to cause the apparatus to:
    receive an indication of the plurality of portions of the respective durations.

7. The apparatus of claim 6, wherein the plurality of portions of the respective durations are preconfigured within the UE.

8. The apparatus of claim 1, wherein the instructions are further executable by the processor to cause the apparatus to:
    receive, from the network entity via a unicast message or a multicast message in the third portion of the first duration, the additional encoded transmission based at least in part on the assistance information comprising an indication that at least a portion of the first encoded transmission was not successfully decoded.

9. The apparatus of claim 1, wherein the additional encoded transmission comprises one of a plurality of multiple-user multiple-input multiple-output transmissions transmitted by the network entity in the third portion of the first duration to the UE and other UEs.

10. The apparatus of claim 1, wherein the rateless code comprises a fountain code, a Luby transform code, a Raptor code, or a combination thereof.

11. An apparatus for wireless communications at a network entity, comprising:
a processor,
memory coupled with the processor; and
instructions stored in the memory and executable by the processor to cause the apparatus to:
determine configuration information for communication of a plurality of data blocks in a plurality of respective durations, the configuration information comprising a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof;
transmit, to a first user equipment (UE) and a second UE, the configuration information for communication of the plurality of data blocks;
transmit, in the first portion of a first duration via a broadcast message associated with a first data block, the first encoded transmission for the first data block, the first encoded transmission being encoded based at least in part on a rateless code; and
receive, from the first UE and the second UE during the second portion of the first duration indicated in the configuration information for reporting assistance information for the first encoded transmission, respective assistance information based at least in part on the first and second UEs attempting decoding processes for the first encoded transmission.

12. The apparatus of claim 11, wherein the instructions are further executable by the processor to cause the apparatus to:
determine that the first UE failed to decode at least a portion of the first encoded transmission based at least in part on the respective assistance information; and
transmit, to the first UE, a first additional encoded transmission based at least in part on the determination.

13. The apparatus of claim 12, wherein the first encoded transmission comprises a plurality of encoded packets, and wherein the assistance information comprises channel state information to be used for a unicast or a multicast transmission of one or more encoded transmissions, and wherein the additional encoded transmission comprises a retransmission of one or more packets of the plurality of encoded packets based at least in part on the channel state information.

14. The apparatus of claim 12, wherein the instructions are further executable by the processor to cause the apparatus to:
determine that the second UE failed to decode at least a portion of the first encoded transmission based at least in part on the respective assistance information; and
transmit, to the second UE, a second additional encoded transmission based at least in part on the determination.

15. The apparatus of claim 14, wherein the first additional encoded transmission and the second additional encoded transmission comprise a multiple-user multiple-input multiple-output transmission.

16. The apparatus of claim 12, wherein the instructions are further executable by the processor to cause the apparatus to:
determine that the second UE failed to decode at least a portion of the first encoded transmission based at least in part on the respective assistance information; and
transmit the first additional encoded transmission in a multicast message to the first UE and the second UE.

17. The apparatus of claim 12, wherein the first encoded transmission comprises a plurality of encoded packets, and wherein the assistance information comprises an indication of one or more packets of the plurality of encoded packets not successfully decoded by the first UE or the second UE, and wherein the additional encoded transmission comprises a retransmission of the one or more packets.

18. The apparatus of claim 12, wherein the first encoded transmission comprises a plurality of encoded packets, and wherein the assistance information comprises an indication that a decoding process at the first UE or the second UE was unsuccessful, and wherein the additional encoded transmission comprises one or more additional encoded packets based at least in part on the rateless code.

19. The apparatus of claim 11, wherein the instructions to transmit the configuration information are executable by the processor to cause the apparatus to:
transmit an indication of at least one of the plurality of portions.

20. The apparatus of claim 11, wherein the instructions are further executable by the processor to cause the apparatus to:
determine the plurality of portions based at least in part on one or more UE metrics for a set of UEs including the first UE and the second UE, the one or more UE metrics comprising a signal-to-noise ratio for the set of UEs, a location of the set of UEs, channel state information from the set of UEs, or a combination thereof.

21. The apparatus of claim 11, wherein the rateless code comprises a fountain code, a Luby transform code, a Raptor code, or a combination thereof.

22. A method for wireless communications at a user equipment (UE), comprising:
receiving, from a network entity, configuration information for communication of a plurality of data blocks in a plurality of respective durations;
determining, based at least in part on the configuration information, a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof;
receiving, from the network entity via a broadcast message in the first portion of a first duration of the plurality of respective durations, the first encoded transmission for a respective data block of the plurality of data blocks, wherein the first encoded transmission is based at least in part on a rateless code;
performing a decoding process on the first encoded transmission; and
transmitting, to the network entity, assistance information during the second portion of the first duration indicated in the configuration information for reporting assistance information for the first encoded transmission based at least in part on performing the decoding process.

23. The method of claim 22, further comprising:
receiving, from the network entity via a unicast message or a multicast message in the third portion of the first duration, the additional encoded transmission based at least in part on the assistance information comprising an indication that at least a portion of the first encoded transmission was not successfully decoded.

24. The method of claim 23, wherein the first encoded transmission comprises a plurality of encoded packets, and wherein the assistance information comprises an indication of one or more packets of the plurality of encoded packets not successfully decoded in the decoding process, and wherein the additional encoded transmission comprises a retransmission of the one or more packets.

25. The method of claim 23, wherein the first encoded transmission comprises a plurality of encoded packets, and wherein the assistance information comprises an indication that the decoding process was unsuccessful, and wherein the additional encoded transmission comprises one or more additional encoded packets based at least in part on the rateless code.

26. The method of claim 22, wherein receiving the configuration information comprises:
receiving an indication of the plurality of portions of the respective durations.

27. A method for wireless communications at a network entity, comprising:
determining configuration information for communication of a plurality of data blocks in a plurality of respective durations, the configuration information comprising a plurality of portions of each of the respective durations comprising a first portion for communication of a first encoded transmission via broadcast, a second portion for reporting assistance information for the first encoded transmission, a third portion for communication of an additional encoded transmission via unicast or multicast, or a combination thereof;
transmitting, to a first user equipment (UE) and a second UE, the configuration information for communication of the plurality of data blocks;
transmitting, in the first portion of a first duration via a broadcast message associated with a first data block, the first encoded transmission for the first data block, the first encoded transmission being encoded based at least in part on a rateless code; and
receiving, from the first UE and the second UE during the second portion of the first duration indicated in the configuration information for reporting assistance information for the first encoded transmission, respective assistance information based at least in part on the first and second UEs attempting decoding processes for the first encoded transmission.

28. The method of claim 27, further comprising:
determining that the first UE failed to decode at least a portion of the first encoded transmission based at least in part on the respective assistance information; and
transmitting, to the first UE, a first additional encoded transmission based at least in part on the determination.

29. The method of claim 28, wherein the first encoded transmission comprises a plurality of encoded packets, and wherein the assistance information comprises channel state information to be used for a unicast or a multicast transmission of one or more encoded transmissions, and wherein the additional encoded transmission comprises a retransmission of one or more packets of the plurality of encoded packets based at least in part on the channel state information.

30. The method of claim 28, further comprising:
determining that the second UE failed to decode at least a portion of the first encoded transmission based at least in part on the respective assistance information; and
transmitting, to the second UE, a second additional encoded transmission based at least in part on the determination.

* * * * *